US010731677B2

(12) United States Patent
Jamison et al.

(10) Patent No.: US 10,731,677 B2
(45) Date of Patent: Aug. 4, 2020

(54) PNEUMATIC CONTROL VALVE MANIFOLD

(71) Applicant: MAC Valves, Inc., Wixom, MI (US)

(72) Inventors: Michael Jamison, Fenton, MI (US);
Matthew Neff, Birmingham, MI (US);
Jeffrey Simmonds, Commerce
Township, MI (US)

(73) Assignee: MAC Valves, Inc., Wixom, MI (US)

( * ) Notice: Subject to any disclaimer, the term of this patent is extended or adjusted under 35 U.S.C. 154(b) by 203 days.

(21) Appl. No.: 15/854,914

(22) Filed: Dec. 27, 2017

(65) Prior Publication Data
US 2019/0195246 A1   Jun. 27, 2019

(51) Int. Cl.
*F15B 13/08* (2006.01)
*F16K 31/06* (2006.01)
*F15B 13/00* (2006.01)

(52) U.S. Cl.
CPC ...... *F15B 13/0807* (2013.01); *F15B 13/0814* (2013.01); *F15B 13/0821* (2013.01);
(Continued)

(58) Field of Classification Search
CPC .............. F15B 13/0814; F15B 13/0821; F15B 13/0828; F15B 13/0839; F15B 13/0807;
(Continued)

(56) References Cited

U.S. PATENT DOCUMENTS 4,640,311 A * 2/1987 Martinet ............... F15B 11/068
137/271
4,754,776 A * 7/1988 McKee ................. F16K 11/044
137/102

(Continued)

FOREIGN PATENT DOCUMENTS

| DE | 2224308 A1 | 1/1974 |
| DE | 10208390 A1 | 5/2003 |
| EP | 1008764 A1 | 6/2000 |

OTHER PUBLICATIONS

International Search Report and Written Opinion for corresponding European Application 18214800.7, dated Jun. 19, 2018.

*Primary Examiner* — Angelisa L. Hicks
(74) *Attorney, Agent, or Firm* — Harness, Dickey & Pierce, P.L.C.

(57) ABSTRACT

A pneumatic control valve manifold assembly including a modular manifold segment with first and second valve receiving bores, inlet and exhaust cavities, and fluid passageways. The modular manifold segment has a mating face and a back-side face. The fluid passageways are arranged in fluid communication with the first and second valve receiving bores, are open to the modular manifold segment mating face, and have multiple configurations. The modular manifold segment mating face includes an abutment surface surrounding the fluid passageways that has a plurality of shapes depending upon the configuration of the fluid passageways. The modular manifold segment back-side face includes a plurality of sealing ribs arranged in a pattern that universally mates with each of the different shapes of the abutment surface such that multiple modular manifold segments with different fluid passageways can be stacked next to each other.

20 Claims, 23 Drawing Sheets

(52) U.S. Cl.
CPC ...... *F15B 13/0828* (2013.01); *F15B 13/0839* (2013.01); *F15B 13/0896* (2013.01); *F16K 31/06* (2013.01); *F15B 2013/002* (2013.01); *F15B 2013/006* (2013.01); *F15B 2211/30565* (2013.01); *F15B 2211/8855* (2013.01)

(58) Field of Classification Search
CPC .......... F15B 2013/002; F15B 2013/004; F15B 2013/006; F16K 31/06
USPC ............................... 137/625.48, 625.6, 844
See application file for complete search history.

(56) References Cited

U.S. PATENT DOCUMENTS

| | | | | |
|---|---|---|---|---|
| 5,462,087 | A * | 10/1995 | Fukano | F15B 13/0825 137/596.16 |
| 5,706,858 | A * | 1/1998 | Miyazoe | F15B 13/0825 137/884 |
| 5,730,174 | A * | 3/1998 | Mismas | F15B 13/044 137/269 |
| 6,408,868 | B2 * | 6/2002 | Rondreux | F15B 13/0807 137/270 |
| 6,763,848 | B2 * | 7/2004 | Rondreux | F15B 13/0817 137/269 |
| 8,047,234 | B2 * | 11/2011 | Takada | F15B 13/0828 137/884 |
| 8,082,943 | B2 * | 12/2011 | Brenner | F15B 13/081 137/271 |
| 8,167,000 | B2 | 5/2012 | Neff et al. | |
| 2008/0087346 | A1 | 4/2008 | Takada et al. | |

* cited by examiner

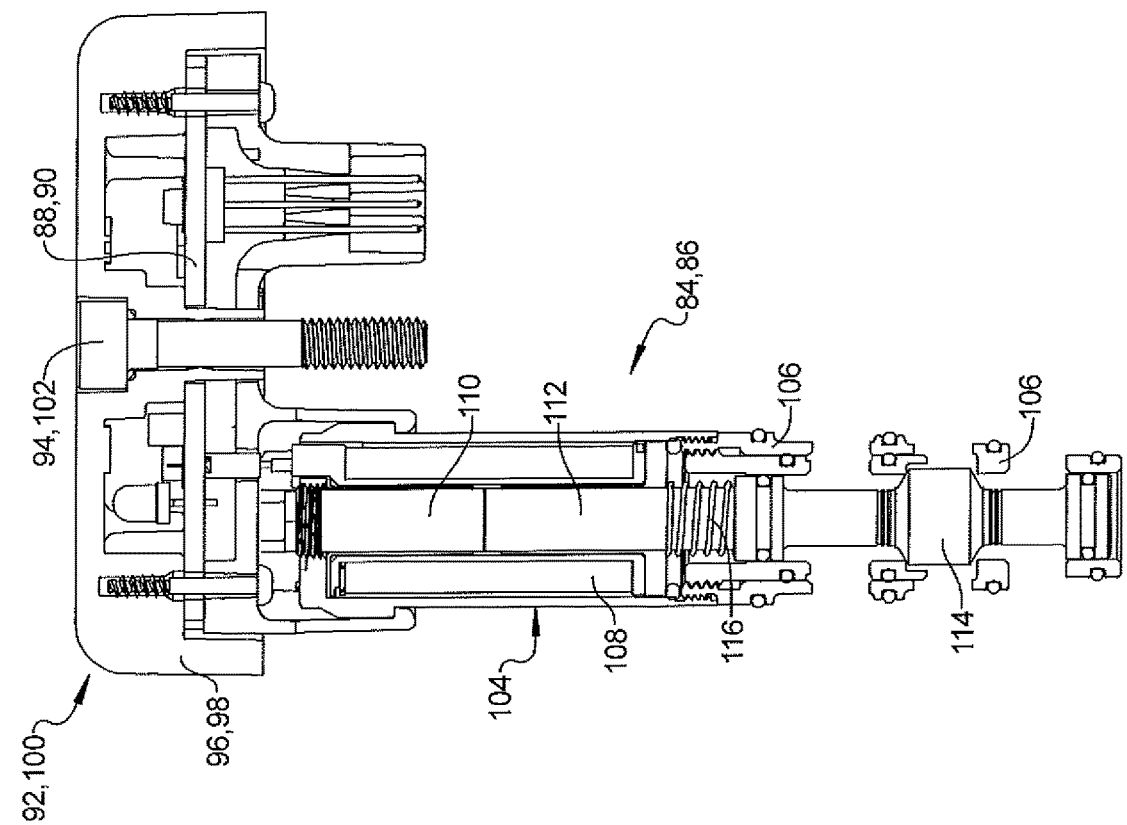
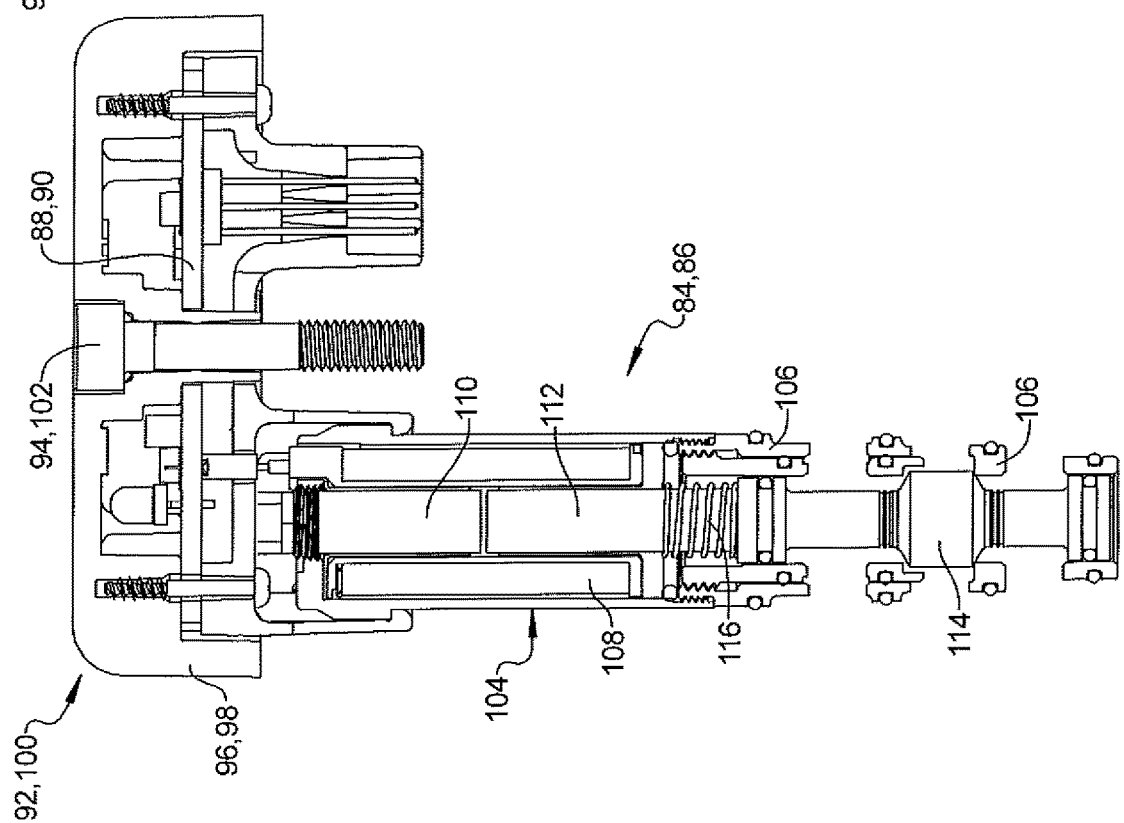

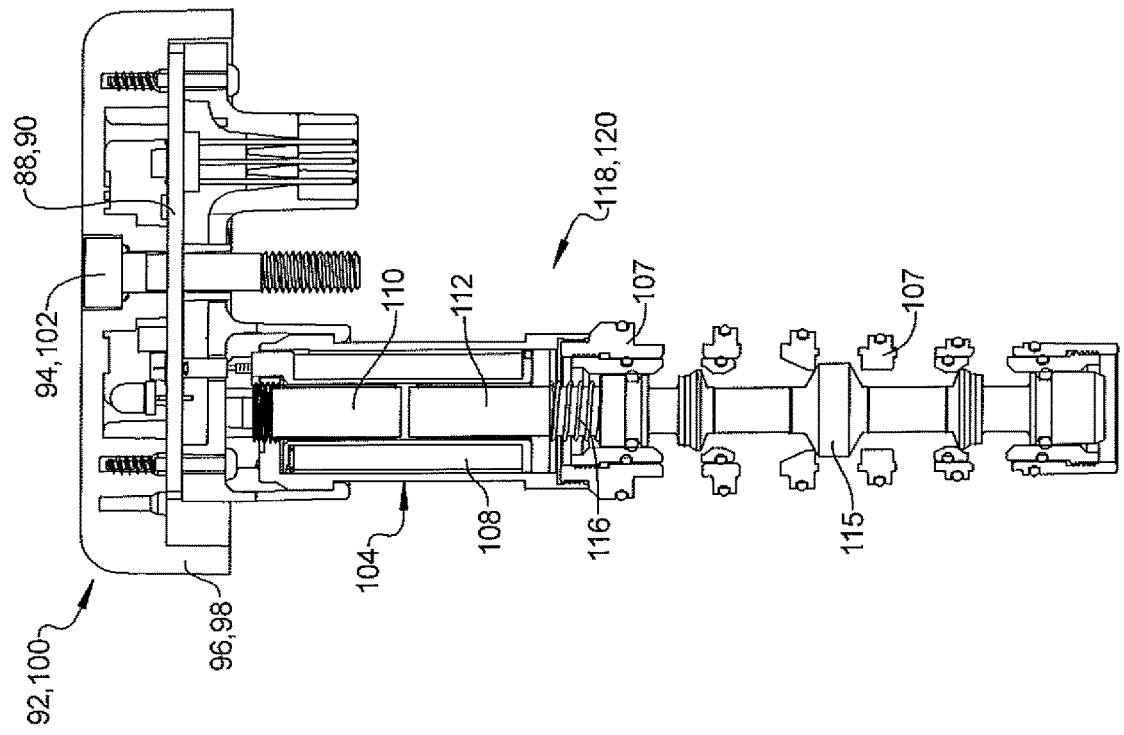
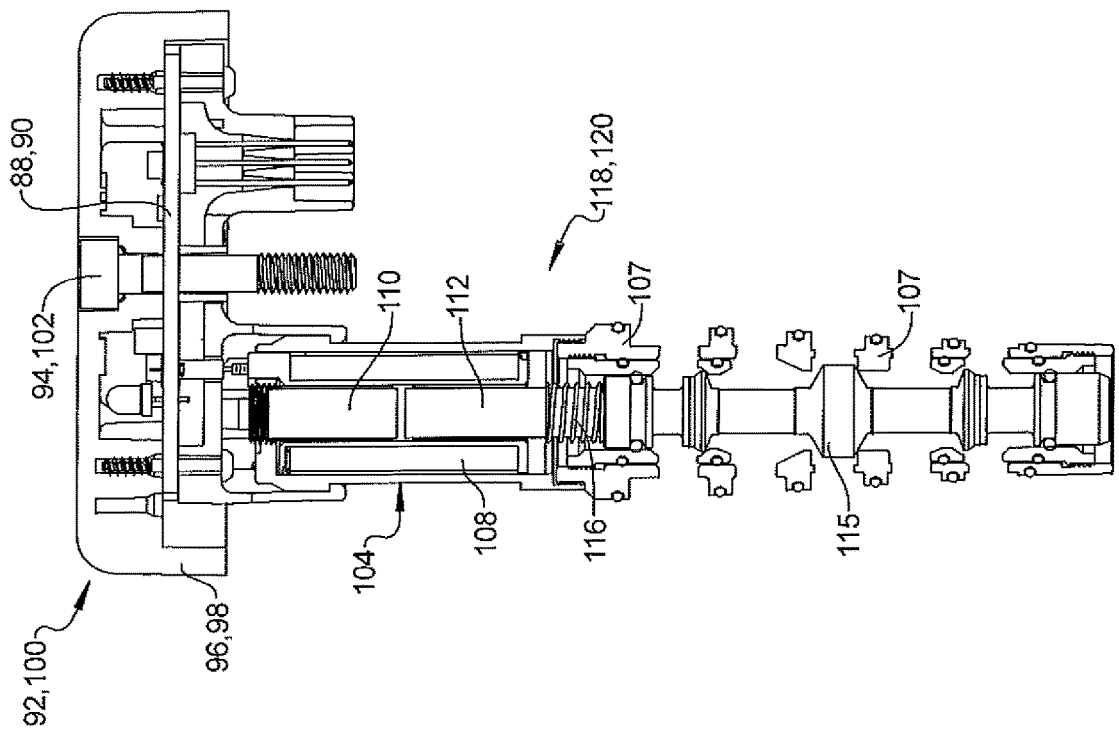

PNEUMATIC CONTROL VALVE MANIFOLD

FIELD

The present disclosure generally relates to the field of pneumatic control valve manifold assemblies. More specifically, a pneumatic control valve manifold assembly is disclosed that includes modular manifold segments that can be stacked together.

BACKGROUND

This section provides background information related to the present disclosure which is not necessarily prior art.

Pneumatic systems are used in a wide variety of applications for controlling and/or operating various types of equipment. Examples of such equipment include sorters, packaging machines, and food processors. Pneumatic systems often include one or more control valve manifolds. Typical control valve manifolds have multiple passageways that are arranged in fluid communication with multiple valve receiving bores. Solenoid operated valves are installed in the valve receiving bores to control fluid flow through the passageways in the control valve manifold. The passageways are usually arranged in fluid communication with ports disposed along the perimeter of the control valve manifold. Such ports may include inlet ports, outlet ports, and exhaust ports. Although other fluids may be used, the working fluid supplied to pneumatic control valve manifolds is usually pressurized air. The inlet ports of the manifold are typically connected to a pressurized air source, the exhaust ports are often vented to the atmosphere, and the outlet ports are often connected to one or more pieces of air-driven equipment.

SUMMARY

This section provides a general summary of the disclosure and is not a comprehensive disclosure of its full scope or all of its features.

In accordance with one aspect of the subject disclosure, a pneumatic control valve manifold assembly is provided. The pneumatic control valve manifold assembly comprises a modular manifold segment including a modular manifold segment outer perimeter, a modular manifold segment mating face, and a modular manifold segment back-side face. First and second valve receiving bores extend inwardly into the modular manifold segment from the modular manifold segment outer perimeter. Inlet and exhaust cavities extend through the modular manifold segment and pass between the first and second valve receiving bores such that the inlet and exhaust cavities are open at the modular manifold segment mating face and the modular manifold segment back-side face.

A plurality of fluid passageways are arranged in fluid communication with the first and second valve receiving bores. The plurality of fluid passageways are open to the modular manifold segment mating face and follow one of a plurality of configurations that provide different combinations of valve operations. The modular manifold segment mating face includes an abutment surface surrounding the plurality of fluid passageways. The abutment surface has a plurality of shapes depending upon the configuration of the plurality of fluid passageways. The modular manifold segment back-side face includes a plurality of sealing ribs arranged in a pattern that universally mates with each of the plurality of shapes of the abutment surface. As a result, modular manifold segments with fluid passageways of different configurations can be stacked next to each other in the pneumatic control valve manifold assembly in a fluid-tight arrangement. Advantageously, the universal pattern formed by the plurality of sealing ribs on the modular manifold segment back-side face provides for greater configurability of the pneumatic control valve manifold assembly, which is particularly beneficial in applications where a single pneumatic control valve manifold assembly is being used in a complex pneumatic system to control and/or operate different pieces of equipment.

In accordance with another aspect of the subject disclosure, the pneumatic control valve manifold assembly includes a plurality of the modular manifold segments described above stacked between a first manifold end segment and a second manifold end segment. In accordance with yet another aspect of the subject disclosure, the modular manifold segment includes a first valve received within the first valve receiving bore and a second valve received within the second valve receiving bore. The first and second valves may be, without limitation, three-way or four-way solenoid operated valves.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 5A is a front elevation view of an exemplary three-way solenoid valve of the exemplary modular manifold segment illustrated in FIG. 3A where the exemplary three-way solenoid valve is shown in a de-energized position;

FIG. 5B is a front elevation view of an exemplary three-way solenoid valve of the exemplary modular manifold segment illustrated in FIG. 3A where the exemplary three-way solenoid valve is shown in an energized position;

FIG. 6A is a front elevation view of an exemplary four-way solenoid valve of the exemplary modular manifold segment illustrated in FIG. 4A where the exemplary four-way solenoid valve is shown in the de-energized position;

FIG. 6B is a front elevation view of an exemplary four-way solenoid valve of the exemplary modular manifold segment illustrated in FIG. 4A where the exemplary four-way solenoid valve is shown in the energized position;

DETAILED DESCRIPTION

Figure 1:
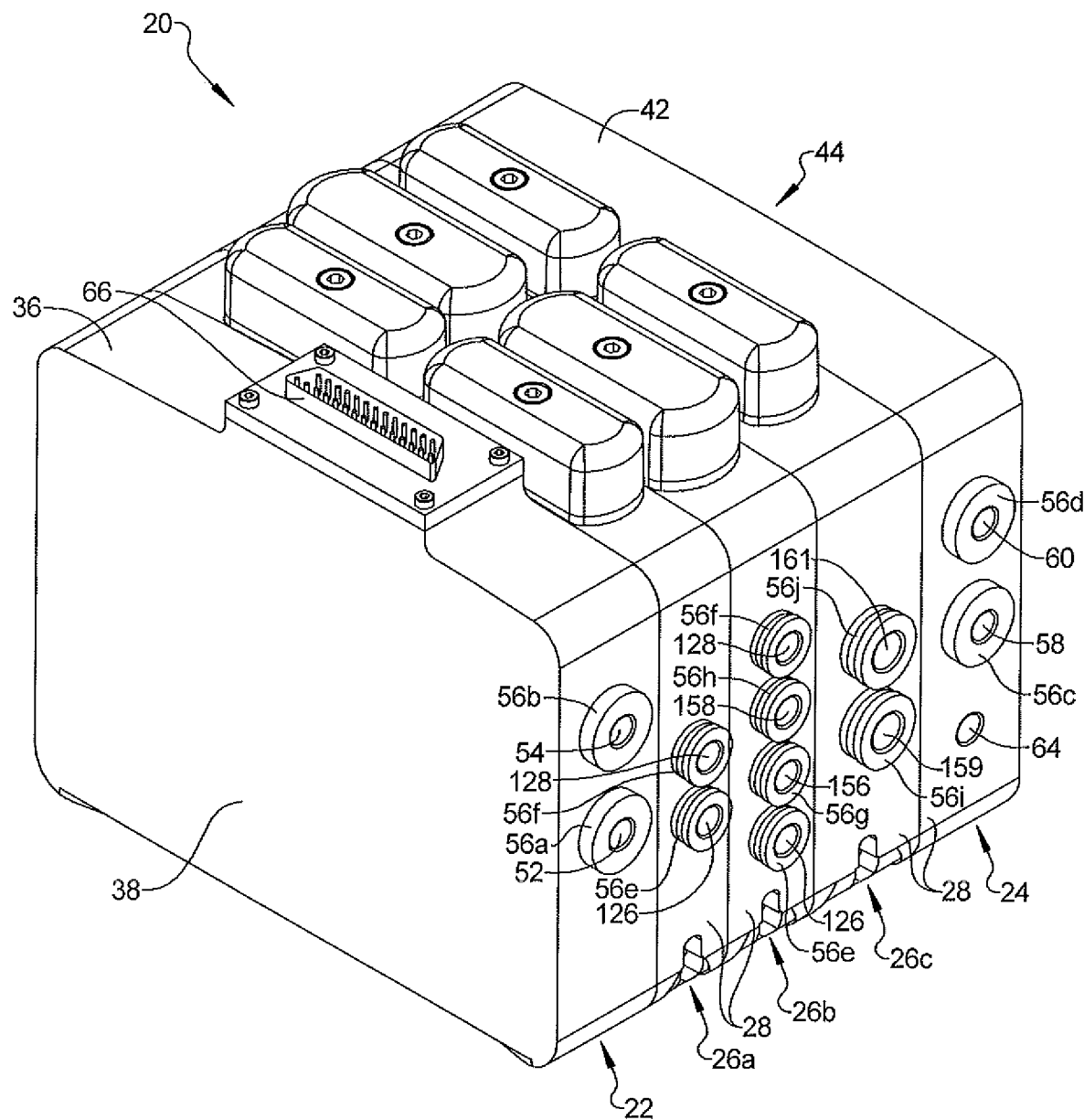
FIG. 1 is a front perspective view of an exemplary pneumatic control valve manifold assembly constructed according to the subject disclosure.

Referring to the Figures, wherein like numerals indicate corresponding parts throughout the several views, a pneumatic control valve manifold assembly 20 is illustrated.

Example embodiments are provided so that this disclosure will be thorough, and will fully convey the scope to those who are skilled in the art. Numerous specific details are set fourth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 2:
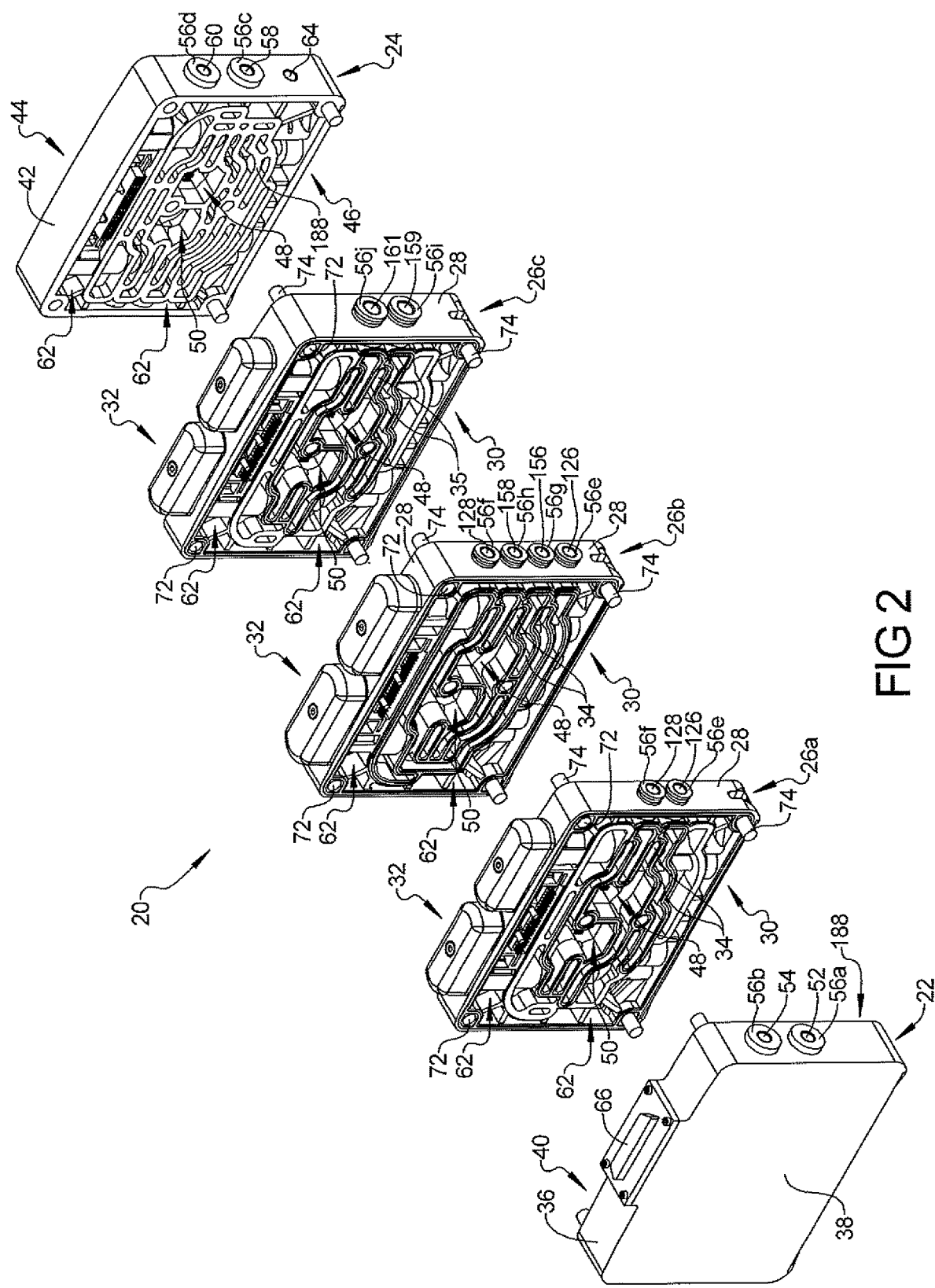
FIG. 2 is a front perspective exploded view of the exemplary pneumatic control valve manifold assembly illustrated in FIG. 1.

With reference to FIGS. 1 and 2, the pneumatic control valve manifold assembly 20 includes a first manifold end segment 22, a second manifold end segment 24, and a plurality of modular manifold segments 26a, 26b, 26c positioned between the first manifold end segment 22 and the second manifold end segment 24. Although three exemplary modular manifold segments 26a, 26b, 26c are shown in FIGS. 1 and 2, it should be appreciated that the pneumatic control valve manifold assembly 20 may include as little as one modular manifold segment 26a and as many as ten or more modular manifold segments and is completely configurable by stacking different combinations of modular manifold segments 26a, 26b, 26c together between the first and second manifold end segments 22, 24. Each of the modular manifold segments 26a, 26b, 26c includes a modular manifold segment outer perimeter 28, a modular manifold segment mating face 30, and a modular manifold segment back-side face 32. A plurality of fluid passageways 34 are disposed on and are open to the modular manifold segment mating face 30 of each of the modular manifold segments 26a, 26b, 26c. When multiple modular manifold segments 26a, 26b, 26c are stacked next to each other, the modular manifold segment back-side face 32 of one modular manifold segment 26a is configured to abut the modular manifold mating face of an adjacent modular manifold segment 26a for example.

The first manifold end segment 22 includes a first manifold end segment outer perimeter 36, a first manifold end face 38, and a first manifold end segment mating face 40. Similarly, the second manifold end segment 24 includes a second manifold end segment outer perimeter 42, a second manifold end face 44, and a second manifold end segment mating face 46. The first and second manifold end segments 22, 24 are arranged in the pneumatic control valve manifold assembly 20 such that the first and second manifold end segment mating faces 40, 46 face inwardly towards each other and are adapted to abut the modular manifold segments 26a, 26c. Specifically, the first manifold end segment mating face 40 is configured to abut the modular manifold segment mating face 30 of an adjacent modular manifold segment 26a and the second manifold end segment mating face 46 is configured to abut the modular manifold segment back-side face 32 of an adjacent modular manifold segment 26c. The first and second manifold end faces 38, 44 face outwardly away from each other and away from the modular manifold segments 26a, 26b, 26c.

With additional reference to FIGS. 2-4B, the pneumatic control valve manifold assembly 20 includes an inlet cavity 48 and an exhaust cavity 50. The inlet cavity 48 extends from the first manifold end segment 22, through the plurality of modular manifold segments 26a, 26b, 26c, and into the second manifold end segment 24. Similarly, the exhaust cavity 50 extends from the first manifold end segment 22, through the plurality of modular manifold segments 26a, 26b, 26c, and into the second manifold end segment 24. The inlet and exhaust cavities 48, 50 are open to the first and second manifold end segment mating faces 40, 46, but do not extend through (i.e., are closed at) the first and second manifold end faces 38, 44 of the first and second manifold end segments 22, 24. It should be appreciated that although other fluids may be used, when the working fluid supplied to the pneumatic control valve manifold assembly 20 is pressurized air, the inlet cavity 48 receives inlet air and the exhaust cavity 50 receives exhaust air.

The first manifold end segment 22 includes a first inlet port 52 and a first exhaust port 54, both of which are disposed along the first manifold end segment outer perimeter 36, The first inlet port 52, which may include a fitting 56a, is arranged in fluid communication with the inlet cavity 48. The first exhaust port 54, which also may include a fitting 56b, is arranged in fluid communication with the exhaust cavity 50. The second manifold end segment 24 includes a second inlet port 58 and a second exhaust port 60, both of which are disposed along the second manifold end segment outer perimeter 42. The second inlet port 58, which may include a fitting 56c, is arranged in fluid communication with the inlet cavity 48. The second exhaust port 60, which also may include a fitting 56d, is arranged in fluid communication with the exhaust cavity 50. The first and second inlet ports 52, 58 may be configured to be connected to a pressurized fluid source (not shown) and the first and second exhaust ports 54, 60 may be configured to vent to the atmosphere or a piped line (not shown) to an outside source. It should be appreciated that other configurations are possible. For example, the number of inlet and exhaust ports 52, 54, 58, 60 may be increased or decreased. For example and without limitation, a single inlet port 52 and a single exhaust port 54 may be provided on one of the first and second manifold end segments 22, 24.

Optionally, the pneumatic control valve manifold assembly 20 may include a vent cavity 62 that extends from the first manifold end segment 22, through the plurality of modular manifold segments 26a, 26b, 26c, and into the second manifold end segment 24. At least one of the first and second manifold end segments 22, 24 may include a vent port 64 that is arranged in fluid communication with the vent cavity 62. The vent port 64 may be open to the atmosphere or a piped line (not shown) to an outside source. While a number of different configurations are possible, in the illustrated embodiment, the vent port 64 is provided on the second manifold end segment 24 and the vent cavity 62 is comprised of multiple passages that extend through the plurality of modular manifold segments 26a, 26b, 26c adjacent to the modular manifold segment outer perimeter 28 of each modular manifold segment 26a, 26b, 26c. Alternatively, multiple vent ports may be provided.

At least one of the first and second manifold end segments 22, 24 includes a plug interface 66. The plug interface 66 is configured to be electrically connected to an external processor, such as a computer (not shown). While a number of different configurations are possible, in the illustrated embodiment, the plug interface 66 is provided on the first manifold end segment 22. A socket connector 68 is disposed on the modular manifold segment back-side face 32 of each of the modular manifold segments 26a, 26b, 26c and on the first manifold end segment mating face 40. Correspondingly, a terminal connector 70 is disposed on the modular manifold segment mating face 30 of each of the modular manifold segments 26a, 26b, 26c and on the second manifold end segment mating face 46. The terminal connectors 70 are configured to make electrical contact with the socket connectors 68. It should be appreciated that this arrangement of the socket connectors 68 and the terminal connectors 70 may be reversed from the arrangement described above and shown in the figures.

The modular manifold segment mating face 30 and the modular manifold segment back-side face 32 of each modular manifold segment 26a, 26b, 26c includes tie rod receiving holes 72. Tie rods 74 are disposed within and extend longitudinally from the tie rod receiving holes 72 to align and secure the plurality of modular manifold segments 26a, 26b, 26c. While a number of different configurations are possible, in the illustrated embodiment, each modular manifold segment 26a, 26b, 26c has six tie rod receiving holes 72 and six tie rods 74.

With continued reference to FIGS. 3A-4B, each of the modular manifold segments 26a, 26b, 26c includes a first valve receiving bore 76 and a second valve receiving bore 78. The first and second valve receiving bores 76, 78 extend inwardly into the modular manifold segment 26a, 26b, 26c from the modular manifold segment outer perimeter 28. A first valve axis 80 extends co-axially within the first valve receiving bore 76 and a second valve axis 82 extending co-axially within the second valve receiving bore 78.

Although other configurations are possible, the first valve axis 80 is substantially parallel to the second valve axis 82 and the inlet and exhaust cavities 48, 50 pass between the first and second valve receiving bores 76, 78. In other words, the inlet and exhaust cavities 48, 50 are centrally located (i.e., spaced well in-board of the modular manifold segment outer perimeter 28) in the modular manifold segments 26a, 26b, 26e.

With reference to FIGS. 3A-B and FIGS. 5A-B, a first three-way solenoid valve 84 is received within the first valve receiving bore 76 and a second three-way solenoid valve 86 is received within the second valve receiving bore 78. A first controller 88 is electrically connected to the first three-way solenoid valve 84 and a second controller 90 is electrically connected to the second three-way solenoid valve 86. The first and second controllers 88, 90 are printed circuit boards that are electrically connected to the first and second three-way solenoid valves 84, 86. The first and second controllers 88, 90 are configured (e.g., built and programmed) to control the operation of the first and second three-way solenoid valves 84, 86.

The first three-way solenoid valve 84 and the first controller 88 are mounted to a first cartridge 92 that is attached to the modular manifold segment outer perimeter 28 by a first fastener 94. Although the first fastener 94 may take a variety of different forms, in the illustrated example, the first fastener 94 is a bolt. A first valve cover 96 is connected to at least one of the first cartridge 92 and the modular manifold segment outer perimeter 28. The first valve cover 96 extends over and covers the top of the first three-way solenoid valve 84 and the first controller 88 to protect these electrical components from impact, dust, liquid, and other contaminants. The first cartridge 92 carries the first three-way solenoid valve 84, the first controller 88, and the first valve cover 96 and therefore enables quick and easy installation or removal of these components.

The second three-way solenoid valve 86 and the second controller 90 are mounted to a second cartridge 100 that is attached to the modular manifold segment outer perimeter 28 by a second fastener 102. Although the second fastener 102 may take a variety of different forms, in the illustrated example, the second fastener 102 is a bolt. A second valve cover 98 is connected to at least one of the second cartridge 100 and the modular manifold segment outer perimeter 28. The second valve cover 98 extends over and covers the top of the second three-way solenoid valve 86 and the second controller 90 to protect these electrical components from impact, dust, liquid, and other contaminants. The second cartridge 100 carries the second three-way solenoid valve 86, the second controller 90, and the second valve cover 98 and therefore enables quick and easy installation or removal of these components.

As best seen in FIGS. 5A-B, the first and second three-way solenoid valves 84, 86 each includes a solenoid 104 connected to a valve body 106. The solenoid 104 includes a coil 108 that is electrically connected to one of the first and second controllers 88, 90, a pole piece 110 that is at least partially disposed within the coil 108, and an armature 112. At least part of the armature 112 is slidingly disposed in the coil 108 for movement between a de-energized position (FIG. 5A) and an energized position (FIG. 5B). A valve member 114, connected to or integral with the armature 112, is slidingly disposed within the valve body 106. The armature 112 and/or valve body 106 is biased to the de-energized position by a biasing member 116. By way of non-limiting example, the biasing member 116 may be a compression spring that applies a biasing force to the armature 112 and/or valve member 114. When electricity is supplied to the coil 108 by one of the first and second controllers 88, 90, the coil 108 and pole piece 110 generate a magnetic field and create an attractive force that pulls the armature 112 towards the pole piece 110 against biasing force of the biasing member 116 and therefore pulls the armature 112 towards the energized position (FIG. 5B). It should be appreciated that movement of the valve member 114 between the de-energized position (FIG. 5A) and the energized position (FIG. 5B) opens and closes different fluid flow paths through the valve body 106. Optionally, the first and second three-way solenoid valves 84, 86 may be latching solenoid valves. The structure and operation of an exemplary latching solenoid valve is explained in U.S. Patent Provisional Application No. 62/573,257, which is commonly owned by MAC Valves Incorporated and is expressly incorporated herein by reference.

Figure 3A:
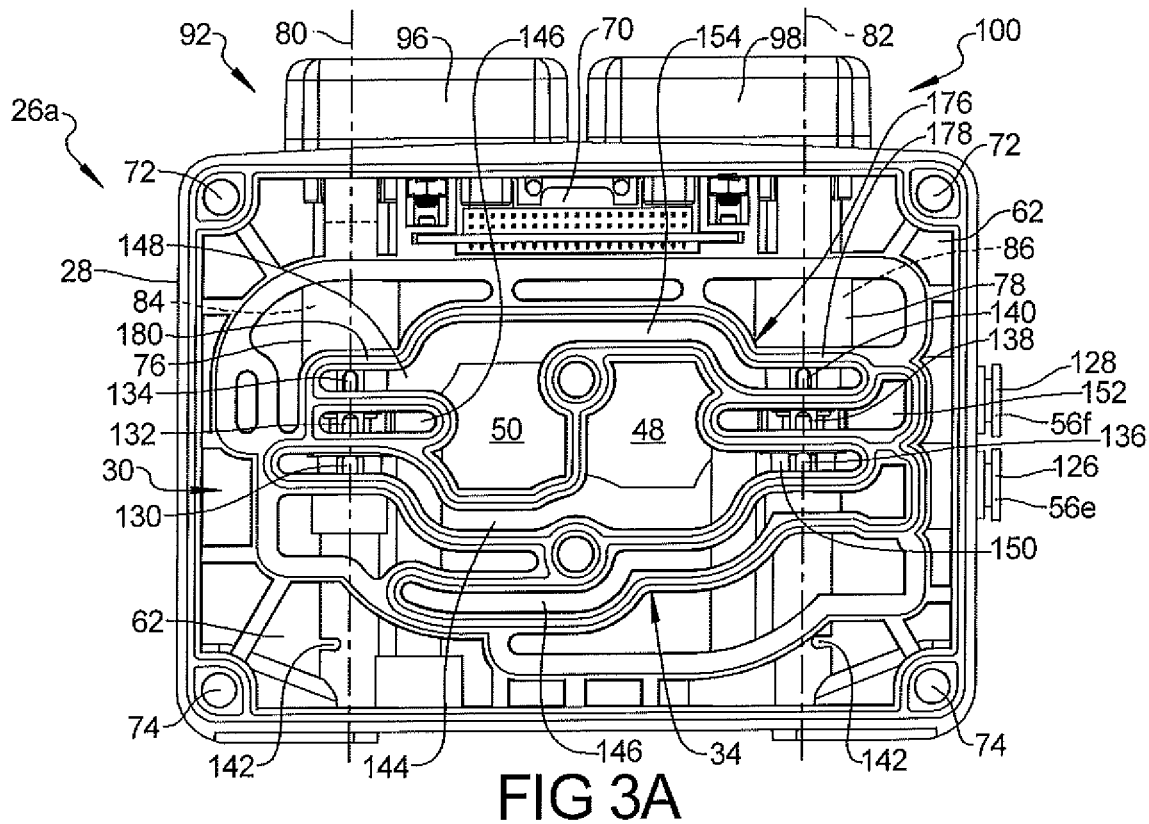
FIG. 3A is a front elevation view of an exemplary modular manifold segment of the exemplary pneumatic control valve manifold assembly illustrated in FIG. 1 where the exemplary modular manifold segment includes a pair of three-way solenoid valves.
Figure 3B:
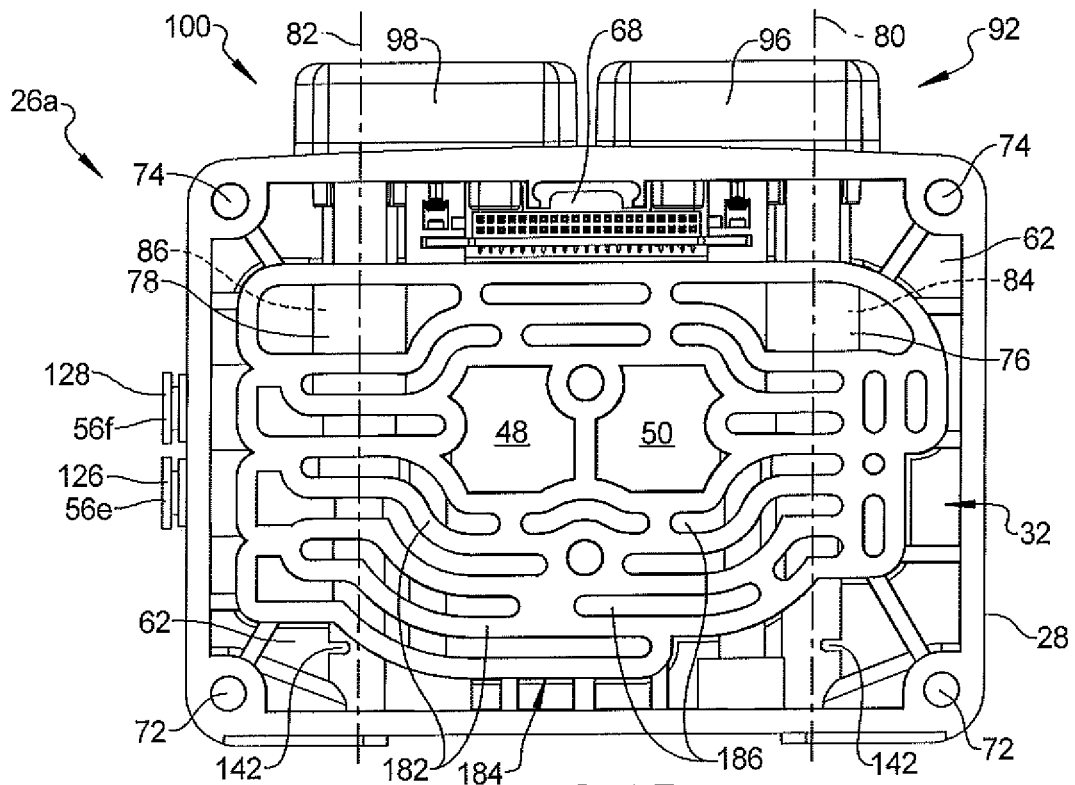
FIG. 3B is a rear elevation view of the exemplary modular manifold segment illustrated in FIG. 3A.

As best seen in FIGS. 3A-B, the modular manifold segment 26a includes a first outlet port 126 and a second outlet port 128, which are both disposed along the modular manifold segment outer perimeter 28. The first and second outlet ports 126, 128, which may include fittings 56e, 56f, may be arranged in fluid communication with one or more pieces of equipment, including without limitation, sorters, packaging machines, and food processors. The first valve receiving bore 76 is arranged in fluid communication with the plurality of fluid passageways 34 at a first inlet opening 130, a first outlet opening 132, and a first exhaust opening 134 and the second valve receiving bore 78 is arranged in fluid communication with the plurality of fluid passageways 34 at a second inlet opening 136, a second outlet opening 138, and a second exhaust opening 140. Each of the first and second valve receiving bores 76, 78 also includes a vent opening 142 disposed in fluid communication with the vent cavity 62.

The plurality of fluid passageways 34 includes a first inlet passageway 144 extending between the first inlet opening 130 and the inlet cavity 48, a first outlet passageway 146 extending between the first outlet opening 132 and the first outlet port 126, and a first exhaust passageway 148 extending between the first exhaust opening 134 and the exhaust cavity 50. The plurality of fluid passageways 34 further includes a second inlet passageway 150 extending between the second inlet opening 136 and the inlet cavity 48, a second outlet passageway 152 extending between the second outlet opening 138 and the second outlet port 128, and a second exhaust passageway 154 extending between the second exhaust opening 140 and the exhaust cavity 50. As will be explained in greater detail below, the order of the first inlet opening 130, the first outlet opening 132, the first exhaust opening 134, the second inlet opening 136, the second outlet opening 138, and the second exhaust opening 140 will depend on whether the first and second three-way solenoid valves 84, 86 are configured to operate as normally-open or normally-closed valves. It should therefore be appreciated that the plurality of fluid passageways 34 may follow a plurality of configurations to provide different combinations of normally-open and normally-closed valve operations. Examples of exemplary configurations are described in greater detail below.

With reference to FIGS. 4A-B and FIGS. 6A-B, a first four-way solenoid valve 118 is received within the first valve receiving bore 76 and a second four-way solenoid valve 120 is received within the second valve receiving bore 78. A first controller 88 electrically connected to the first four-way solenoid valve 118 and a second controller 90 electrically connected to the second four-way solenoid valve 120. The first and second controllers 88, 90 are printed circuit boards that are electrically connected to the first and second four-way solenoid valves 118, 120. The first and second controllers 88, 90 are configured (e.g., built and programmed) to control the operation of the first and second four-way solenoid valves 118, 120.

The first four-way solenoid valve 118 and the first controller 88 are mounted to a first cartridge 92 that is attached to the modular manifold segment outer perimeter 28 by a first fastener 94. Although the first fastener 94 may take a variety of different forms, in the illustrated example, the first fastener 94 is a bolt. A first valve cover 96 is connected to at least one of the first cartridge 92 and the modular manifold segment outer perimeter 28. The first valve cover 96 extends over and covers the top of the first four-way solenoid valve 118 and the first controller 88 to protect these electrical components from impact, dust, liquid, and other contaminants. The first cartridge 92 carries the first four-way solenoid valve 118, the first controller 88, and the first valve cover 96 and therefore enables quick and easy installation or removal of these components.

The second four-way solenoid valve 120 and the second controller 90 are mounted to a second cartridge 100 that is attached to the modular manifold segment outer perimeter 28 by a second fastener 102. Although the second fastener 102 may take a variety of different forms, in the illustrated example, the second fastener 102 is a bolt. A second valve cover 98 is connected to at least one of the second cartridge 100 and the modular manifold segment outer perimeter 28. The second valve cover 98 extends over and covers the top of the second four-way solenoid valve 120 and the second controller 90 to protect these electrical components from impact, dust, liquid, and other contaminants. The second cartridge 100 carries the second four-way solenoid valve 120, the second controller 90, and the second valve cover 98 and therefore enables quick and easy installation or removal of these components.

As best seen in FIGS. 6A-B, the first and second four-way solenoid valves 118, 120 each includes a solenoid 104 connected to a valve body 107. The solenoid 104 includes a coil 108 that is electrically connected to one of the first and second controllers 88, 90, a pole piece 110 that is at least partially disposed within the coil 108, and an armature 112. At least part of the armature 112 is slidingly disposed in the coil 108 for movement between a de-energized position (FIG. 6A) and an energized position (FIG. 6B). A valve member 115, connected to or integral with the armature 112, is slidingly disposed within the valve body 107. The armature 112 and/or valve body 107 is biased to the de-energized position by a biasing member 116. By way of non-limiting example, the biasing member 116 may be a compression spring that applies a biasing force to the armature 112 and/or valve member 115. When electricity is supplied to the coil 108 by one of the first and second controllers 88, 90, the coil 108 and pole piece 110 generate a magnetic field and create an attractive force that pulls the armature 112 forwards the pole piece 110 against biasing force of the biasing member 116 towards the energized position (FIG. 6B). It should be appreciated that movement of the valve member 115 between the de-energized position (FIG. 6A) and the energized position (FIG. 6B) opens and closes different fluid flow paths through the valve body 107.

Figure 4A:
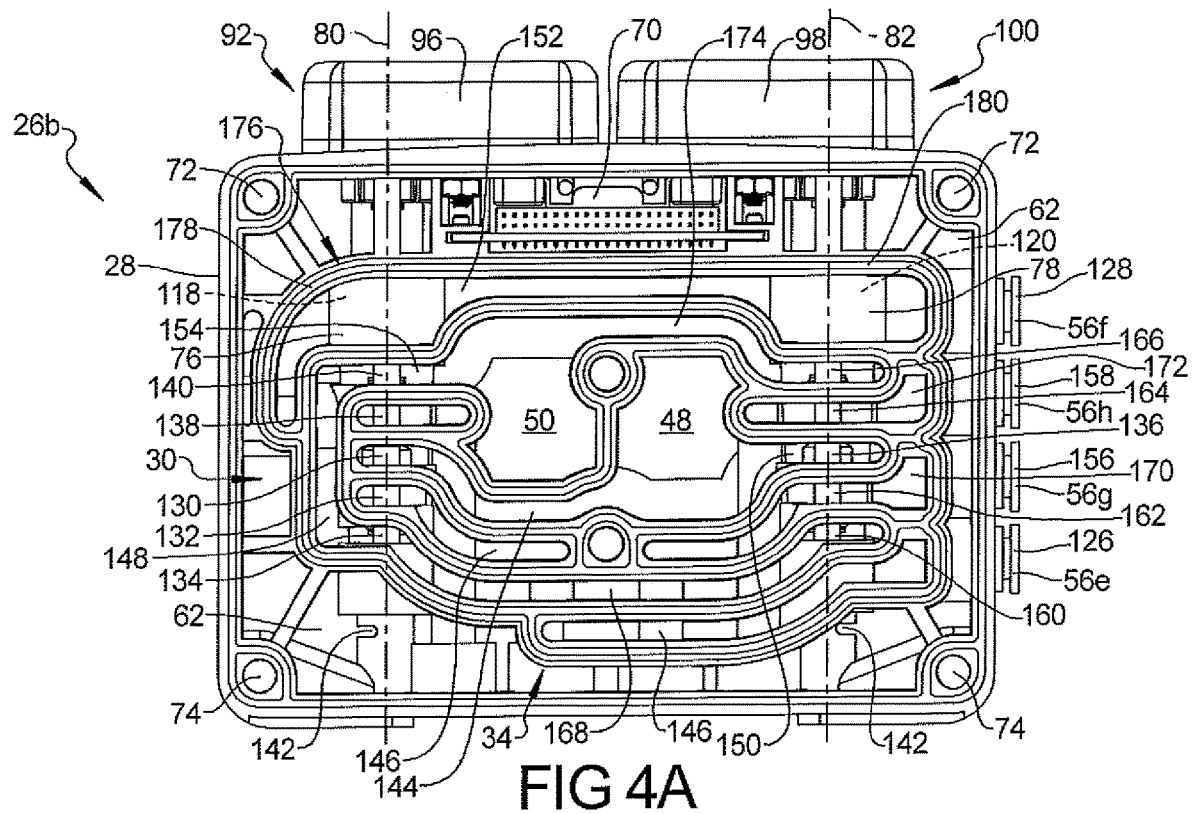
FIG. 4A is a front elevation view of an exemplary modular manifold segment of the exemplary pneumatic control valve manifold assembly illustrated in FIG. 1 where the exemplary modular manifold segment includes a pair of four-way solenoid valves.
Figure 4B:
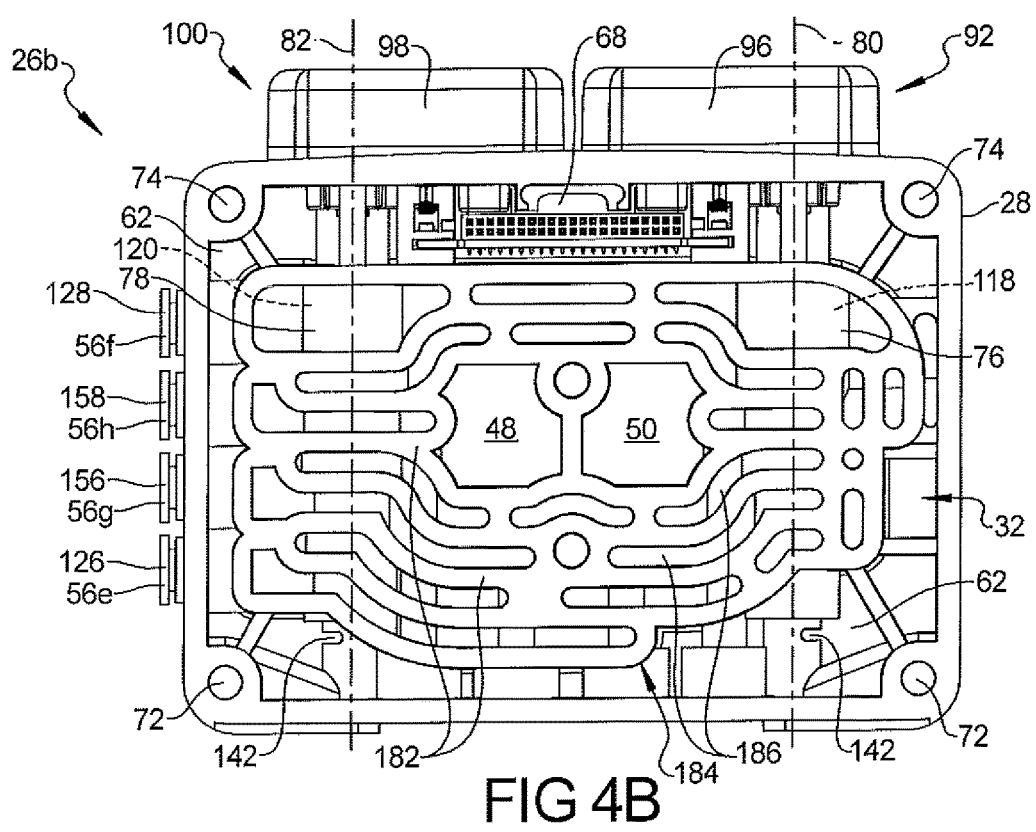
FIG. 4B is a rear elevation view of the exemplary modular manifold segment illustrated in FIG. 4A.

As best seen in FIGS. 4A-B, the modular manifold segment 26b includes a first outlet port 126, a second outlet port 128, a third outlet port 156, and a fourth outlet port 158, which are all disposed along the modular manifold segment outer perimeter 28. The first outlet port 126, the second outlet port 128, the third outlet port 156, and the fourth outlet port 158, which may include fittings 56e, 56f, 56g, 56h, may be arranged in fluid communication with one or more pieces of equipment, including without limitation, sorters, packaging machines, and food processors. The first valve receiving bore 76 is arranged in fluid communication with the plurality of fluid passageways 34 at a first exhaust opening 134, a first outlet opening 132, a first inlet opening 130, a second outlet opening 138, and a second exhaust opening 140. The second valve receiving bore 78 is arranged in fluid communication with the plurality of fluid passageways 34 at a third exhaust opening 160, a third outlet opening 162, a second inlet opening 136, a fourth outlet opening 164, and a fourth exhaust opening 166.

The plurality of fluid passageways 34 include a first exhaust passageway 148 that extends between the first exhaust opening 134 and the exhaust cavity 50, a first outlet passageway 146 that extends between the first outlet opening 132 and the first outlet port 126, a first inlet passageway 144 that extends between the first inlet opening 130 and the inlet cavity 48, a second outlet passageway 152 opening that extends between the second outlet opening 138 and the second outlet port 128, and a second exhaust passageway 154 that extends between the second exhaust opening 140 and the exhaust cavity 50. The plurality of fluid passageways 34 further include a third exhaust passageway 168 that extends between the third exhaust opening 160 and the exhaust cavity 50, a third outlet passageway 170 that extends between the third outlet opening 162 and the third outlet port 156, a second inlet passageway 150 that extends between the second inlet opening 136 and the inlet cavity 48, a fourth outlet passageway 172 that extends between the fourth outlet opening 164 and the fourth outlet port 158, and a fourth exhaust passageway 174 that extends between the fourth exhaust opening 166 and the exhaust cavity 50.

With reference to FIGS. 3A-4B, the modular manifold segment mating face 30 of each modular manifold segment 26 includes an abutment surface 176 surrounding the plurality of fluid passageways 34. Optionally, the abutment surface 176 includes a seal receiving groove 178. A seal 180 is disposed within the seal receiving groove 178. The seal 180 may be made from a variety of different materials, including without limitation, a rubber material. The abutment surface 176 and the seal 180 have a plurality of shapes depending upon the configuration of the plurality of fluid passageways 34. The modular manifold segment back-side face 32 of each modular manifold segment 26 includes a plurality of sealing ribs 182. The plurality of sealing ribs 182 are arranged in a pattern 184 that universally mates with each of the plurality of shapes of the abutment surface 176 such that modular manifold segments 26a, 26b, 26c with fluid passageways 34 of different configurations can be stacked next to each other between the first and second manifold end segments 22, 24 in a fluid-tight arrangement. A plurality of channels 186 are disposed between the plurality of sealing ribs 182 on the modular manifold segment back-side face 32 of each modular manifold segment 26. The plurality of channels 186 are open to the modular manifold segment back-side face 32 and are aligned with portions of the plurality of fluid passageways 34 to increase fluid capacity (i.e., volume) of the plurality of fluid passageways 34. At least one of the first manifold end segment mating face 40 and the second manifold end segment mating face 46 includes a sealing surface 188 that matches the pattern 184 of the plurality of sealing ribs 182. This sealing surface 188 universally mates with each of the plurality of shapes of the abutment surface 176 such that modular manifold segments 26a, 26b, 26c with fluid passageways 34 of different configurations can be stacked next to the first and second manifold end segments 22, 24. Although other configurations are possible, in the illustrated example, the sealing surface 188 is provided on the first and second manifold end segment mating faces 40, 46.

As a result, modular manifold segments 26a, 26b, 26c with fluid passageways 34 of different configurations can be stacked next to each other in the pneumatic control valve manifold assembly 20 in a fluid-tight arrangement. Advantageously, the universal pattern 184 formed by the plurality of sealing ribs 182 on the modular manifold segment backside face 32 provides for greater configurability of the pneumatic control valve manifold assembly 20, which is particularly beneficial in applications where a single pneumatic control valve manifold assembly 20 is being used in a complex pneumatic system to control and/or operate different pieces of equipment. As will be appreciated by the exemplary configurations described below, changing the configuration of the plurality of fluid passageways 34 allows multiple modular manifold segments 26a, 26b, 26c to be created with different functions (i.e., that control fluid flow to the outlet ports 126, 128, 156, 158, 159, 161 differently). In addition, multiple modular manifold segments 26a, 26b, 26c can be created with fluid passageways 34 and outlet ports 126, 128, 156, 158, 159, 161 of varying sizes (i.e., cross-sectional areas). For example, the modular manifold segment 26c includes larger fluid passageways 35, outlet parts 159, 161, and fittings 56i, 56j than the passageways 34, outlet ports 126, 128, 156, 158, and fittings 56e, 56f, 56g, 56h of modular manifold segments 26a, 26b. This allows multiple modular manifold segments 26a, 26b, 26c to be stacked together that provide different volume flowrates of pressurized fluid to the outlet ports 126, 128, 156, 158, 159, 161.

With reference to FIGS. 7A-D, an exemplary modular manifold segment 26a is illustrated that includes first and second three-way solenoid valves 84, 86 and first and second outlet ports 126, 128. Inlet and exhaust cavities 48, 50 pass between first and second valve receiving bores 76, 78 with the inlet cavity 48 positioned closer to the second valve receiving bore 78 and the exhaust cavity 50 positioned closer to the first valve receiving bore 76. The first valve receiving bore 76 includes a first inlet opening 130, a first exhaust opening 134 adjacent to the solenoid 104 of the first three-way solenoid valve 84, and a first outlet opening 132 positioned between the first inlet opening 130 and the first exhaust opening 134. The second valve receiving bore 78 includes a second inlet opening 136, a second exhaust opening 140 adjacent to the solenoid 104 of the second three-way solenoid valve 86, and a second outlet opening 138 positioned between the second inlet opening 136 and the second exhaust opening 140. A first inlet passageway 144 extends between the first inlet opening 130 and the inlet cavity 48, a first outlet passageway 146 extends between the first outlet opening 132 and the first outlet port 126, and a first exhaust passageway 148 extends between the first exhaust opening 134 and the exhaust cavity 50. Similarly, a second inlet passageway 150 extends between the second inlet opening 136 and the inlet cavity 48, a second outlet passageway 152 extends between the second outlet opening 138 and the second outlet port 128, and a second exhaust passageway 154 extends between the second exhaust opening 140 and the exhaust cavity 50. It should be appreciated that the first and second three-way solenoid valves 84, 86 act as normally-closed valves when this configuration is used.

Figure 7A:
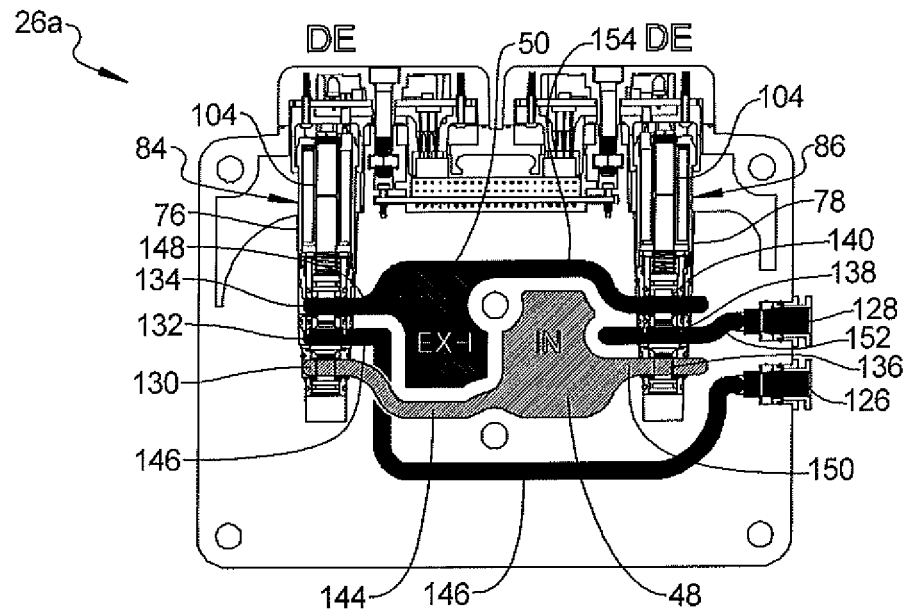
FIG. 7A is a front elevation view of an exemplary modular manifold segment of the exemplary pneumatic control valve manifold assembly illustrated in FIG. 1 where the exemplary modular manifold segment includes first and second three-way solenoid valves in a normally-closed configuration with both the first and second solenoid valves shown in the de-energized position.
Figure 7B:
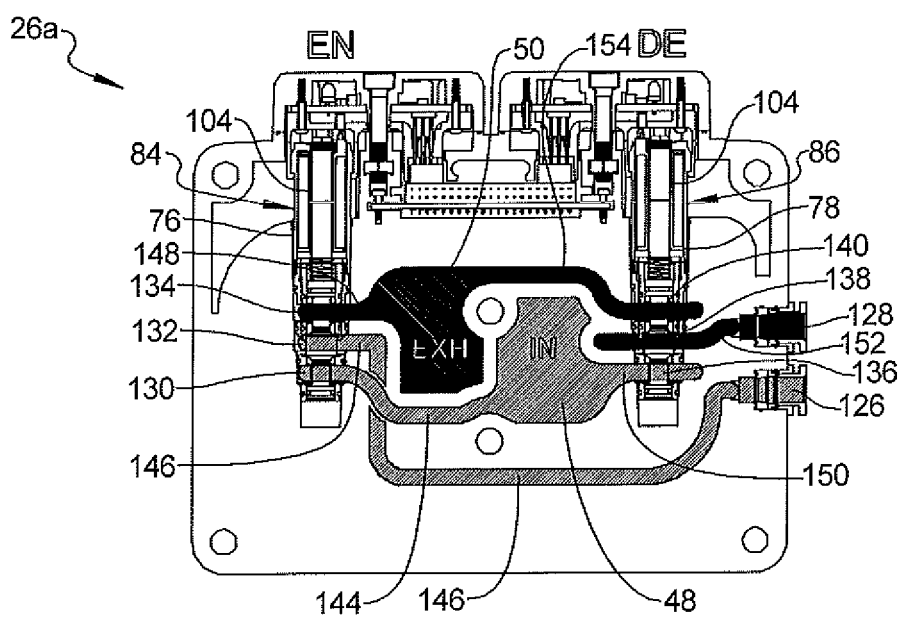
FIG. 7B is a front elevation view of the exemplary modular manifold segment illustrated in FIG. 7A where the first solenoid valve is shown in the energized position and the second solenoid valve is shown in the de-energized position.
Figure 7C:
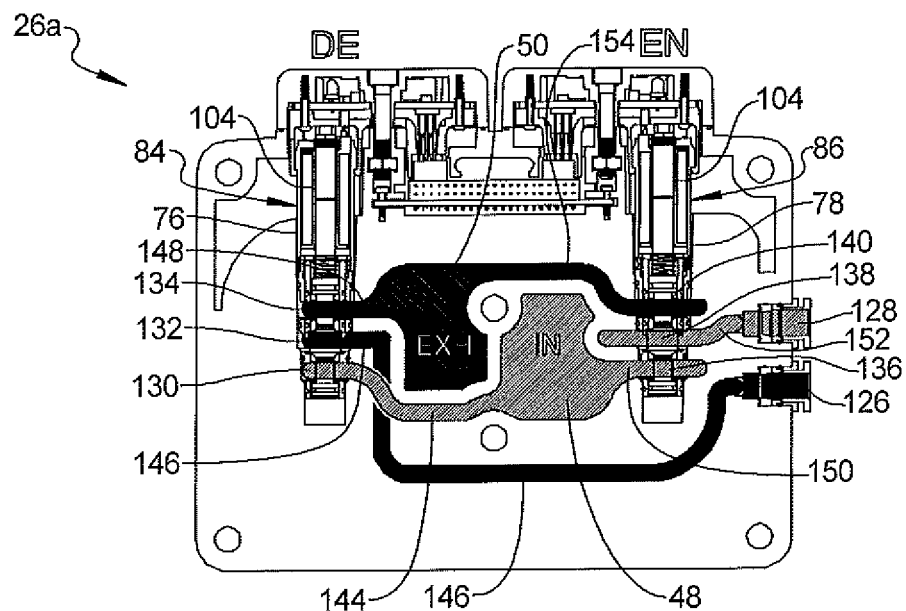
FIG. 7C is a front elevation view of the exemplary modular manifold segment illustrated in FIG. 7A where the first solenoid valve is shown in the de-energized position and the second solenoid valve is shown in the energized position.
Figure 7D:
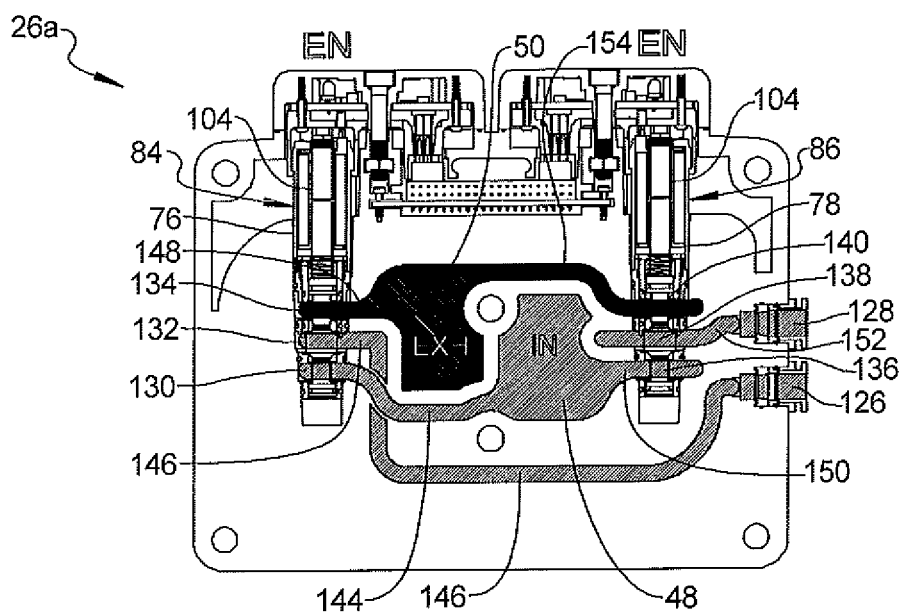
FIG. 7D is a front elevation view of the exemplary modular manifold segment illustrated in FIG. 7A where both the first and second solenoid valves are shown in the energized position.

In FIG. 7A, the first and second three-way solenoid valves 84, 86 are in the de-energized position. Pressurized fluid from the inlet cavity 48 flows into the first and second inlet passageways 144, 150. The first and second three-way solenoid valves 84, 86 are closed in the de-energized position so the first and second outlet ports 126, 128 are vented to the exhaust cavity 50 via the first and second outlet passageways 146, 152 and the first and second exhaust passageways 148, 154. In FIG. 7B, the first three-way solenoid valve 84 is in the energized position and the second three-way solenoid valve 86 is in the de-energized position. Pressurized fluid from the inlet cavity 48 flows into the first and second inlet passageways 144, 150. The first three-way solenoid valve 84 is open in the energized position so the pressurized fluid in the first inlet passageway 144 flows into the first outlet passageway 146 and to the first outlet port 126. The second three-way solenoid valve 86 is closed in the de-energized position so the second outlet port 128 is vented to the exhaust cavity 50 via the second outlet passageway 152 and the second exhaust passageway 154. In FIG. 7C, the first three-way solenoid valve 84 is in the de-energized position and the second three-way solenoid valve 86 is in the energized position. Pressurized fluid from the inlet cavity 48 flows into the first and second inlet passageways 144, 150. The first three-way solenoid valve 84 is closed in the de-energized position so the first outlet port 126 is vented to the exhaust cavity 50 via the first outlet passageway 146 and the first exhaust passageway 148. The second three-way solenoid valve 86 is open in the energized position so the pressurized fluid in the second inlet passageway 150 flows into the second outlet passageway 152 and to the second outlet port 128. In FIG. 7D, the first and second three-way solenoid valves 84, 86 are in the energized position. Pressurized fluid from the inlet cavity 48 flows into the first and second inlet passageways 144, 150. The first and second three-way solenoid valves 84, 86 are open in the energized position so the pressurized fluid in the first and second inlet passageways 144, 150 flows into the first and second outlet passageways 146, 152 and to the first and second outlet ports 126, 128.

With reference to FIGS. 8A-D, an exemplary modular manifold segment 26d is illustrated that includes first and second three-way solenoid valves 84, 86 and first and second outlet ports 126, 128. Inlet and exhaust cavities 48, 50 pass between first and second valve receiving bores 76, 78 with the inlet cavity 48 positioned closer to the second valve receiving bore 78 and the exhaust cavity 50 positioned closer to the first valve receiving bore 76. The first valve receiving bore 76 includes a first inlet opening 130 adjacent to the solenoid 104 of the first three-way solenoid valve 84, a first exhaust opening 134, and a first outlet opening 132 positioned between the first inlet opening 130 and the first exhaust opening 134. The second valve receiving bore 78 includes a second inlet opening 136 adjacent to the solenoid 104 of the second three-way solenoid valve 86, a second exhaust opening 140, and a second outlet opening 138 positioned between the second inlet opening 136 and the second exhaust opening 140. A first inlet passageway 144 extends between the first inlet opening 130 and the inlet cavity 48, a first outlet passageway 146 extends between the first outlet opening 132 and the first outlet port 126, and a first exhaust passageway 148 extends between the first exhaust opening 134 and the exhaust cavity 50. Similarly, a second inlet passageway 150 extends between the second inlet opening 136 and the inlet cavity 48, a second outlet passageway 152 extends between the second outlet opening 138 and the second outlet port 128, and a second exhaust passageway 154 extends between the second exhaust opening 140 and the exhaust cavity 50. It should be appreciated that the first and second three-way solenoid valves 84, 86 act as normally-open valves when this configuration is used.

Figure 8A:
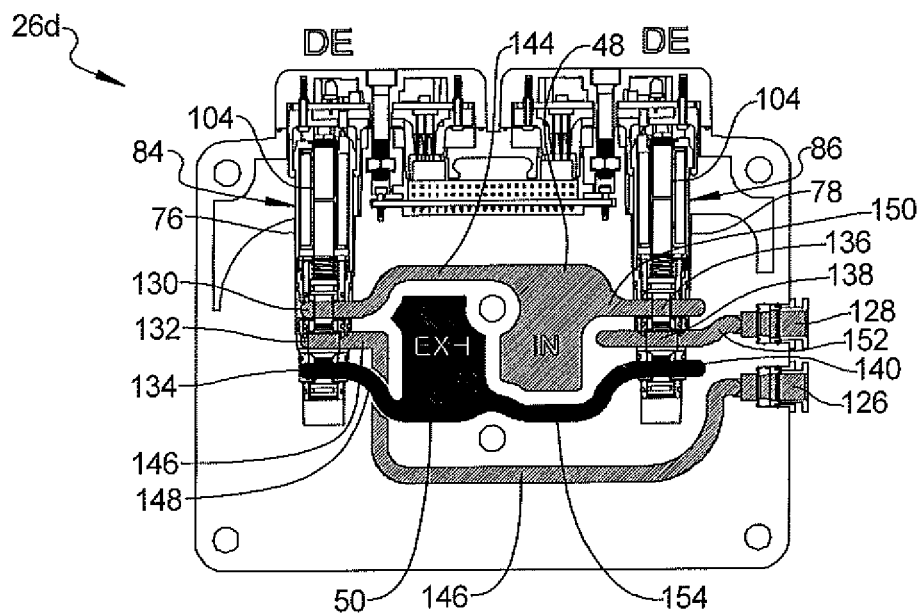
FIG. 8A is a front elevation view of an exemplary modular manifold segment of the exemplary pneumatic control valve manifold assembly illustrated in FIG. 1 where the exemplary modular manifold segment includes first and second three-way solenoid valves in a normally-open configuration with both the first and second solenoid valves shown in the de-energized position.
Figure 8B:
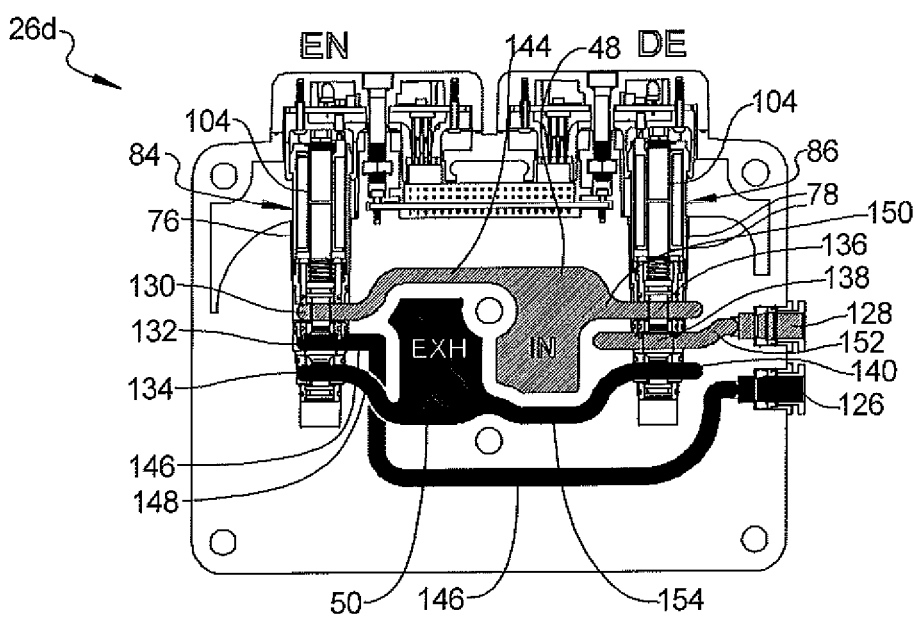
FIG. 8B is a front elevation view of the exemplary modular manifold segment illustrated in FIG. 8A where the first solenoid valve is shown in the energized position and the second solenoid valve is shown in the de-energized position.
Figure 8C:
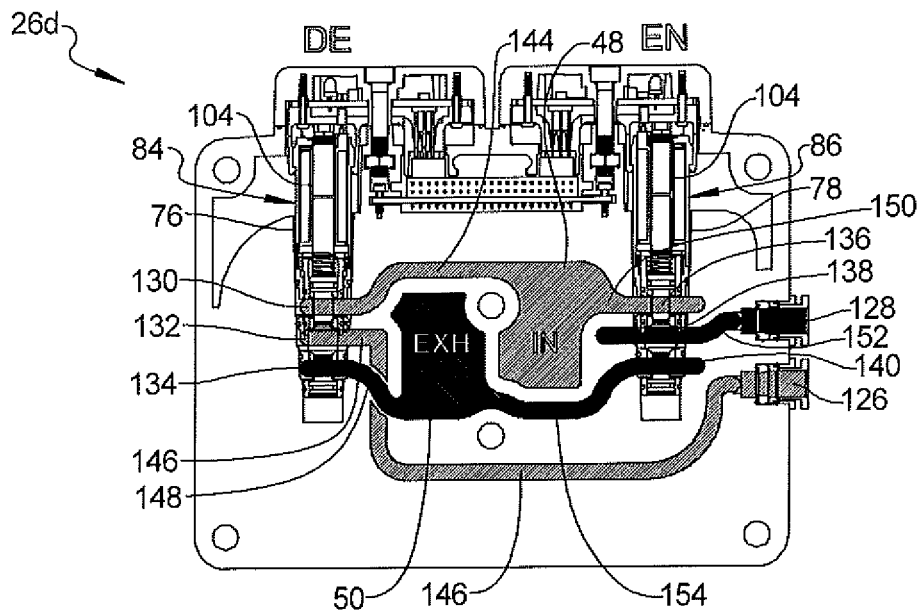
FIG. 8C is a front elevation view of the exemplary modular manifold segment illustrated in FIG. 8A where the first solenoid valve is shown in the de-energized position and the second solenoid valve is shown in the energized position.
Figure 8D:
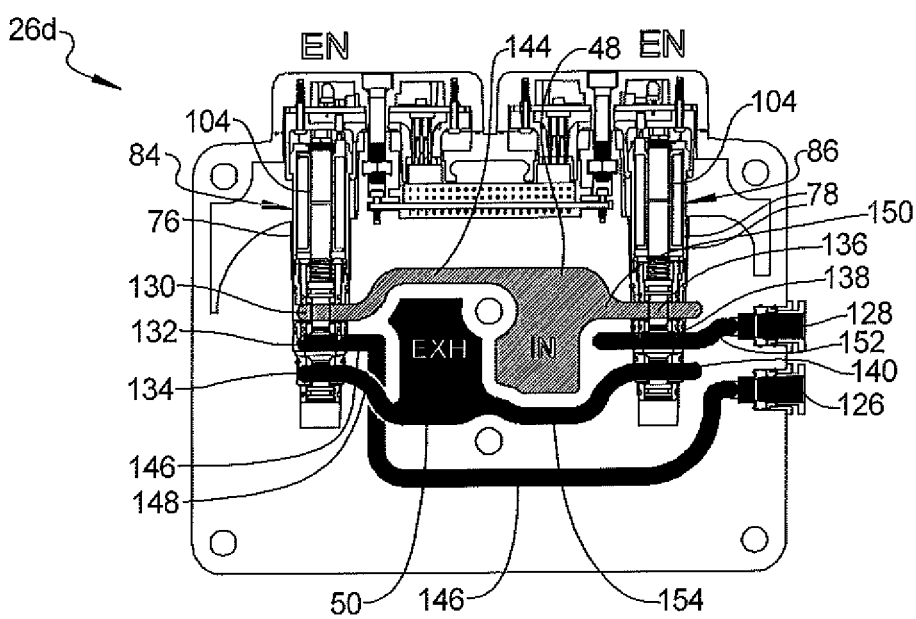
FIG. 8D is a front elevation view of the exemplary modular manifold segment illustrated in FIG. 8A where both the first and second solenoid valves are shown in the energized position.

In FIG. 8A, the first and second three-way solenoid valves 84, 86 are in the de-energized position. Pressurized fluid from the inlet cavity 48 flows into the first and second inlet passageways 144, 150. The first and second three-way solenoid valves 84, 86 are open in the de-energized position so the pressurized fluid in the first and second inlet passageways 144, 150 flows into the first and second outlet passageways 146, 152 and to the first and second outlet ports 126, 128. In FIG. 8B, the first three-way solenoid valve 84 is in the energized position and the second three-way solenoid valve 86 is in the de-energized position. Pressurized fluid from the inlet cavity 48 flows into the first and second inlet passageways 144, 150. The first three-way solenoid valve 84 is closed in the energized position so the first outlet port 126 is vented to the exhaust cavity 50 via the first outlet passageway 146 and the first exhaust passageway 148. The second three-way solenoid valve 86 is open in the de-energized position so the pressurized fluid in the second inlet passageway 150 flows into the second outlet passageway 152 and to the second outlet port 128. In FIG. 8C, the first three-way solenoid valve 84 is in the de-energized position and the second three-way solenoid valve 86 is in the energized position. Pressurized fluid from the inlet cavity 48 flows into the first and second inlet passageways 144, 150. The first three-way solenoid valve 84 is open in the de-energized position so the pressurized fluid in the first inlet passageway 144 flows into the first outlet passageway 146 and to the first outlet port 126. The second three-way solenoid valve 86 is closed in the energized position so the second outlet port 128 is vented to the exhaust cavity 50 via the second outlet passageway 152 and the second exhaust passageway 154. In FIG. 8D, the first and second three-way solenoid valves 84, 86 are in the energized position. Pressurized fluid from the inlet cavity 48 flows into the first and second inlet passageways 144, 150. The first and second three-way solenoid valves 84, 86 are closed in the energized position so the first and second outlet ports 126, 128 are vented to the exhaust cavity 50 via the first and second outlet passageways 146, 152 and the first and second exhaust passageways 148, 154.

With reference to FIGS. 9A-D, an exemplary modular manifold segment 26e is illustrated that includes first and second three-way solenoid valves 84, 86 and first and second outlet ports 126, 128. Inlet and exhaust cavities 48, 50 pass between first and second valve receiving bores 76, 78 with the inlet cavity 48 positioned closer to the second valve receiving bore 78 and the exhaust cavity 50 positioned closer to the first valve receiving bore 76. The first valve receiving bore 76 includes a first inlet opening 130, a first exhaust opening 134 adjacent to the solenoid 104 of the first three-way solenoid valve 84, and a first outlet opening 132 positioned between the first inlet opening 130 and the first exhaust opening 134. The second valve receiving bore 78 includes a second inlet opening 136 adjacent to the solenoid 104 of the second three-way solenoid valve 86, a second exhaust opening 140, and a second outlet opening 138 positioned between the second inlet opening 136 and the second exhaust opening 140. A first inlet passageway 144 extends between the first inlet opening 130 and the inlet cavity 48, a first outlet passageway 146 extends between the first outlet opening 132 and the first outlet port 126, and a first exhaust passageway 148 extends between the first exhaust opening 134 and the exhaust cavity 50. Similarly, a second inlet passageway 150 extends between the second inlet opening 136 and the inlet cavity 48, a second outlet passageway 152 extends between the second outlet opening 138 and the second outlet port 128, and a second exhaust passageway 154 extends between the second exhaust opening 140 and the exhaust cavity 50. It should be appreciated that the first three-way solenoid valve 84 acts as a normally-closed valve and the second three-way solenoid valve 86 acts as a normally-open valve when this configuration is used.

Figure 9A:
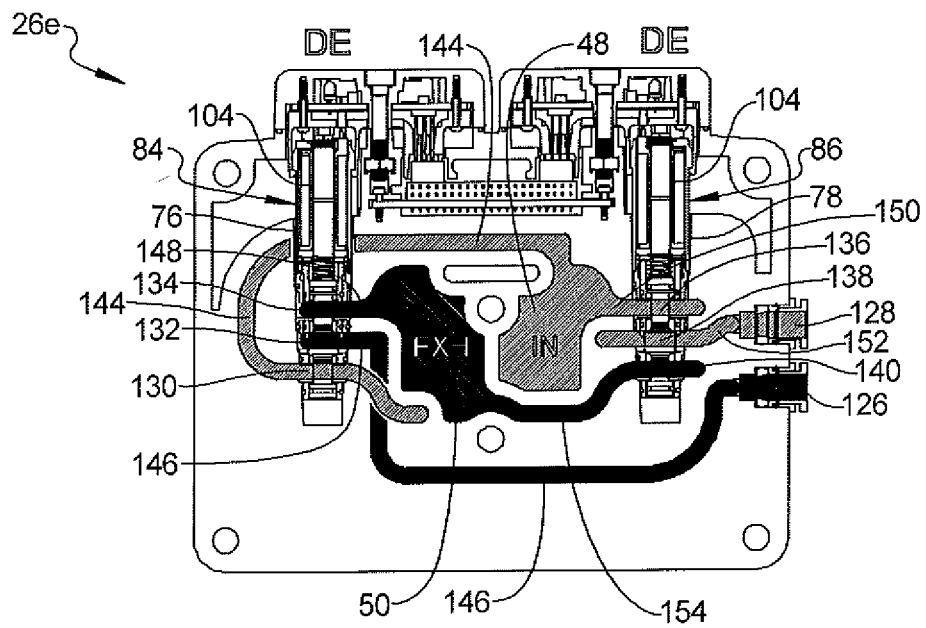
FIG. 9A is a front elevation view of an exemplary modular manifold segment of the exemplary pneumatic control valve manifold assembly illustrated in FIG. 1 where the exemplary modular manifold segment includes a first three-way solenoid valve in a normally-closed configuration and a second three-way solenoid valve in a normally-open configuration with both the first and second solenoid valves shown in the de-energized position.
Figure 9B:
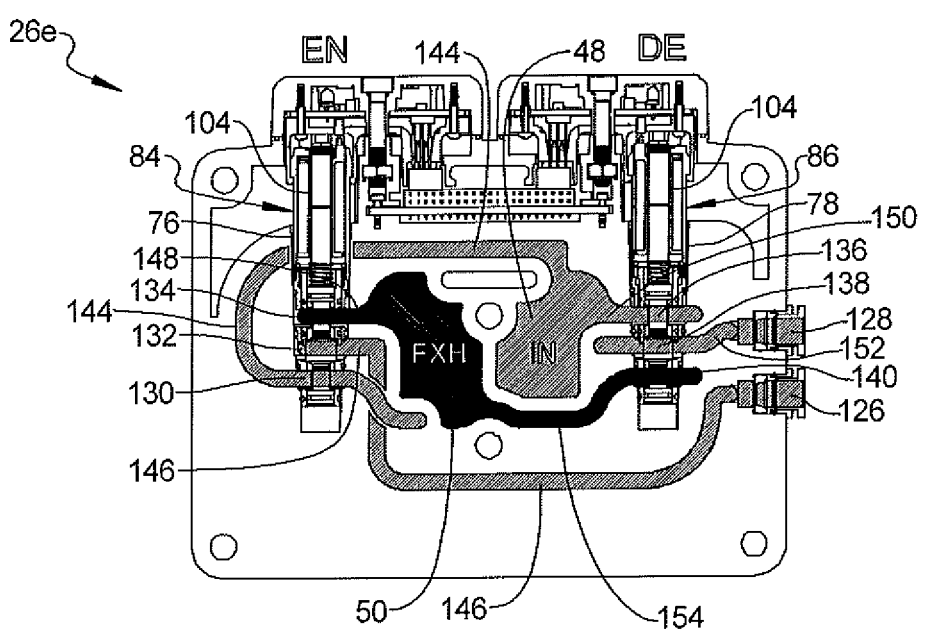
FIG. 9B is a front elevation view of the exemplary modular manifold segment illustrated in FIG. 9A where the first solenoid valve is shown in the energized position and the second solenoid valve is shown in the de-energized position.
Figure 9C:
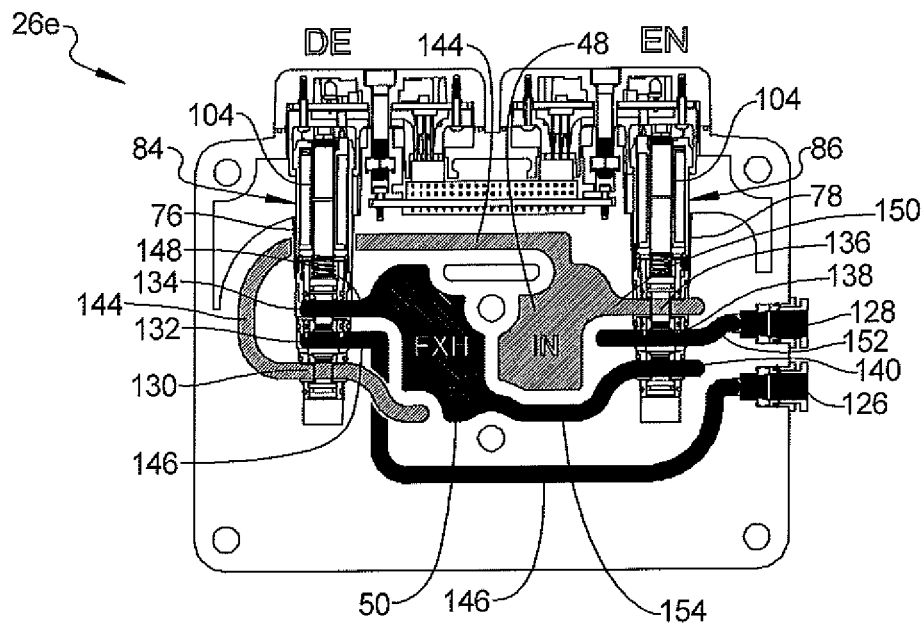
FIG. 9C is a front elevation view of the exemplary modular manifold segment illustrated in FIG. 9A where the first solenoid valve is shown in the de-energized position and the second solenoid valve is shown in the energized position.
Figure 9D:
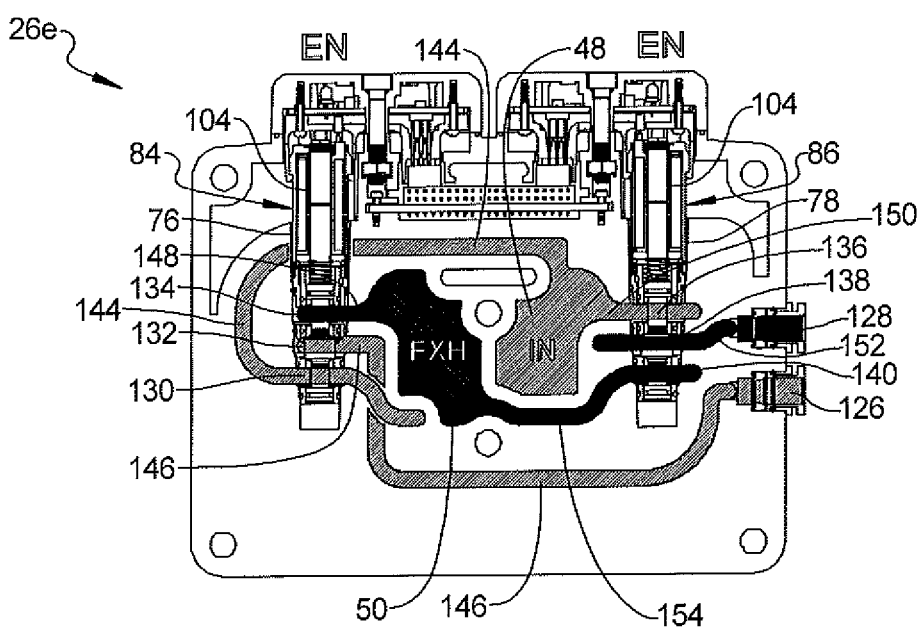
FIG. 9D is a front elevation view of the exemplary modular manifold segment illustrated in FIG. 9A where both the first and second solenoid valves are shown in the energized position.

In FIG. 9A, the first and second three-way solenoid valves 84, 86 are in the de-energized position. Pressurized fluid from the inlet cavity 48 flows into the first and second inlet passageways 144, 150. The first three-way solenoid valve 84 is closed in the de-energized position so the first outlet port 126 is vented to the exhaust cavity 50 via the first outlet passageway 146 and the first exhaust passageway 148. The second three-way solenoid valve 86 is open in the de-energized position so the pressurized fluid in the second inlet passageway 150 flows into the second outlet passageway 152 and to the second outlet port 128. In FIG. 9B, the first three-way solenoid valve 84 is in the energized position and second three-way solenoid valve 86 is in the de-energized position. Pressurized fluid from the inlet cavity 48 flows into the first and second inlet passageways 144, 150. The first three-way solenoid valve 84 is open in the energized position and the second three-way solenoid valve 86 is open in the de-energized position so the pressurized fluid in the first and second inlet passageways 144, 150 flows into the first and second outlet passageways 146, 152 and to the first and second outlet ports 126, 128. In FIG. 9C, the first three-way solenoid valve 84 is in the de-energized position and the second three-way solenoid valve 86 is in the energized position. Pressurized fluid from the inlet cavity 48 flows into the first and second inlet passageways 144, 150. The first three-way solenoid valve 84 is closed in the de-energized position and the second three-way solenoid valve 86 is closed in the energized position so the first and second outlet ports 126, 128 are vented to the exhaust cavity 50 via the first and second outlet passageways 146, 152 and the first and second exhaust passageways 148, 154. In FIG. 9D, the first and second three-way solenoid valves 84, 86 are in the energized position. Pressurized fluid from the inlet cavity 48 flows into the first and second inlet passageways 144, 150. The first three-way solenoid valve 84 is open in the energized position so the pressurized fluid in the first inlet passageway 144 flows into the first outlet passageway 146 and to the first outlet port 126. The second three-way solenoid valve 86 is closed in the energized position so the second outlet port 128 is vented to the exhaust cavity 50 via the second outlet passageway 152 and the second exhaust passageway 154.

With reference to FIGS. 10A-D, an exemplary modular manifold segment 26f is illustrated that includes first and second three-way solenoid valves 84, 86 and first and second outlet ports 126, 128. Inlet and exhaust cavities 48, 50 pass between first and second valve receiving bores 76, 78 with the inlet cavity 48 positioned closer to the second valve receiving bore 78 and the exhaust cavity 50 positioned closer to the first valve receiving bore 76. The first valve receiving bore 76 includes a first inlet opening 130 adjacent to the solenoid 104 of the first three-way solenoid valve 84, a first exhaust opening 134, and a first outlet opening 132 positioned between the first inlet opening 130 and the first exhaust opening 134. The second valve receiving bore 78 includes a second inlet opening 136, a second exhaust opening 140 adjacent to the solenoid 104 of the second three-way solenoid valve 86, and a second outlet opening 138 positioned between the second inlet opening 136 and the second exhaust opening 140. A first inlet passageway 144 extends between the first inlet opening 130 and the inlet cavity 48, a first outlet passageway 146 extends between the first outlet opening 132 and the first outlet port 126, and a first exhaust passageway 148 extends between the first exhaust opening 134 and the exhaust cavity 50. Similarly, a second inlet passageway 150 extends between the second inlet opening 136 and the inlet cavity 48, a second outlet passageway 152 extends between the second outlet opening 138 and the second outlet port 128, and a second exhaust passageway 154 extends between the second exhaust opening 140 and the exhaust cavity 50. It should be appreciated that the first three-way solenoid valve 84 acts as a normally-open valve and the second three-way solenoid valve 86 acts as a normally-closed valve when this configuration is used.

Figure 10A:
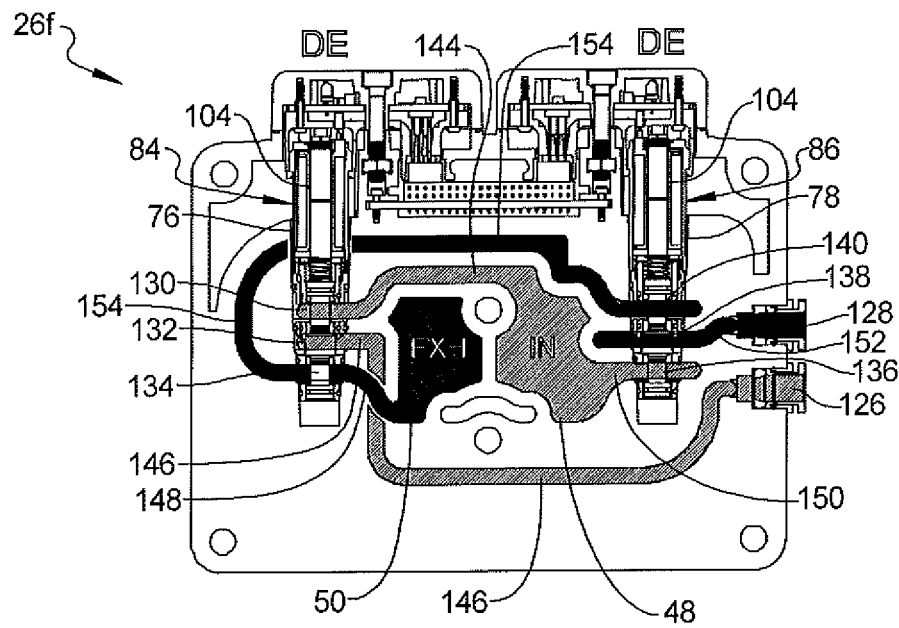
FIG. 10A is a front elevation view of an exemplary modular manifold segment of the exemplary pneumatic control valve manifold assembly illustrated in FIG. 1 where the exemplary modular manifold segment includes a first three-way solenoid valve in a normally-open configuration and a second three-way solenoid valve in a normally-closed configuration with both the first and second solenoid valves shown in the de-energized position.
Figure 10B:
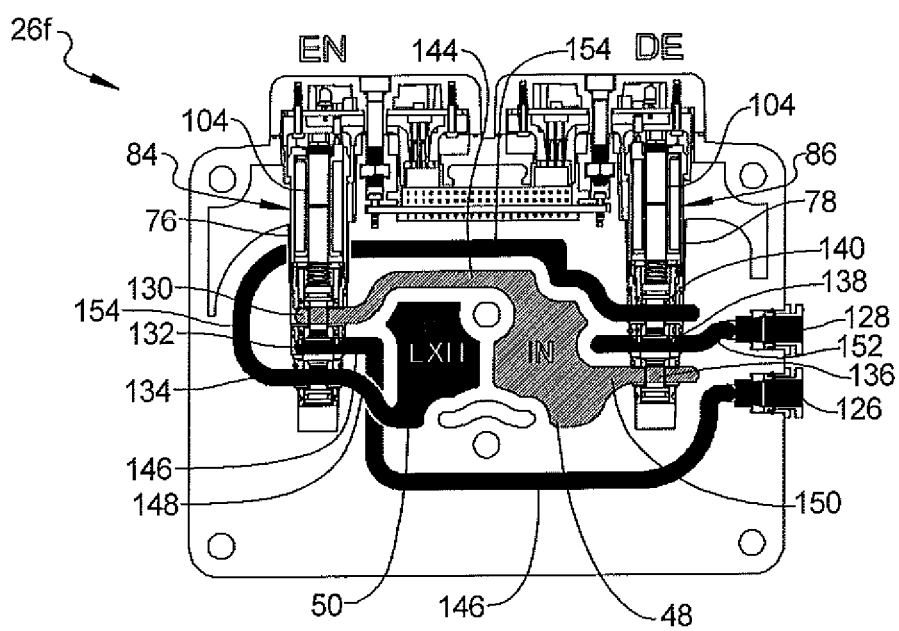
FIG. 10B is a front elevation view of the exemplary modular manifold segment illustrated in FIG. 10A where the first solenoid valve is shown in the energized position and the second solenoid valve is shown in the de-energized position.
Figure 10C:
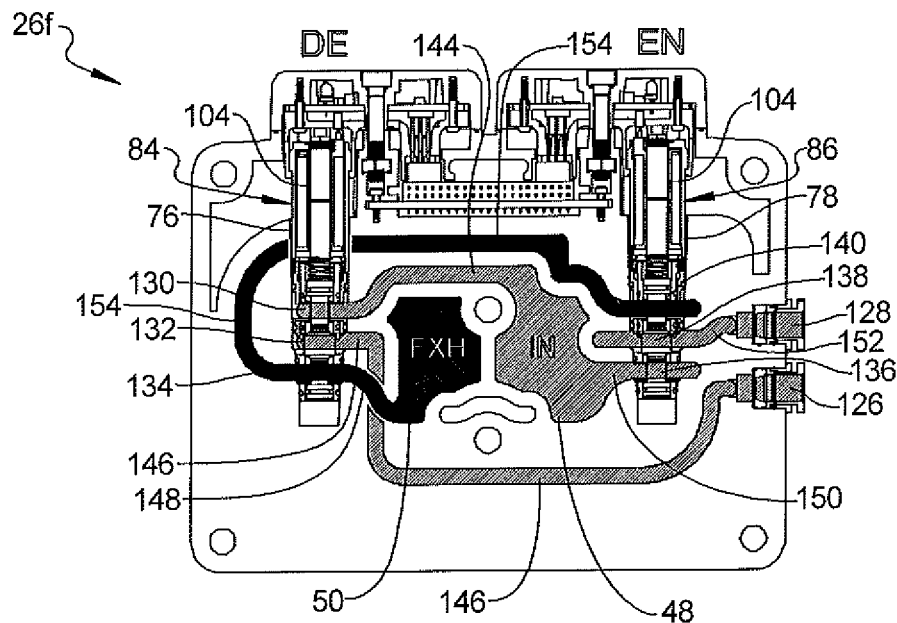
FIG. 10C is a front elevation view of the exemplary modular manifold segment illustrated in FIG. 10A where the first solenoid valve is shown in the de-energized position and the second solenoid valve is shown in the energized position.
Figure 10D:
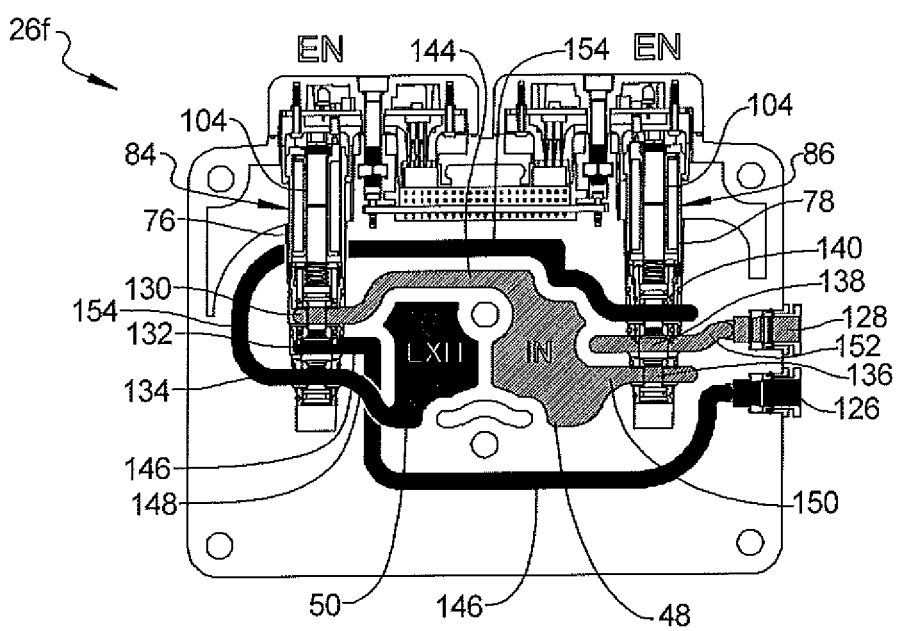
FIG. 10D is a front elevation view of the exemplary modular manifold segment illustrated in FIG. 10A where both the first and second solenoid valves are shown in the energized position.

In FIG. 10A, the first and second three-way solenoid valves 84, 86 are in the de-energized position. Pressurized fluid from the inlet cavity 48 flows into the first and second inlet passageways 144, 150. The first three-way solenoid valve 84 is open in the de-energized position so the pressurized fluid in the first inlet passageway 144 flows into the first outlet passageway 146 and to the first outlet port 126. The second three-way solenoid valve 86 is closed in the de-energized position so the second outlet port 128 is vented to the exhaust cavity 50 via the second outlet passageway 152 and the second exhaust passageway 154. In FIG. 10B, the first three-way solenoid valve 84 is in the energized position and second three-way solenoid valve 86 is in the de-energized position. Pressurized fluid from the inlet cavity 48 flows into the first and second inlet passageways 144, 150. The first three-way solenoid valve 84 is closed in the energized position and the second three-way solenoid valve 86 is closed in the de-energized position so the first and second outlet ports 126, 128 are vented to the exhaust cavity 50 via the first and second outlet passageways 146, 152 and the first and second exhaust passageways 148, 154. In FIG. 10C, the first three-way solenoid valve 84 is in the de-energized position and the second three-way solenoid valve 86 is in the energized position. Pressurized fluid from the inlet cavity 48 flows into the first and second inlet passageways 144, 150. The first three-way solenoid valve 84 is open in the de-energized position and the second three-way solenoid valve 86 is open in the energized position so the pressurized fluid in the first and second inlet passageways 144, 150 flows into the first and second outlet passageways 146, 152 and to the first and second outlet ports 126, 128. In FIG. 10D, the first and second three-way solenoid valves 84, 86 are in the energized position. Pressurized fluid from the inlet cavity 48 flows into the first and second inlet passageways 144, 150. The first three-way solenoid valve 84 is closed in the energized position so the first outlet port 126 is vented to the exhaust cavity 50 via the first outlet passageway 146 and the first exhaust passageway 148. The second three-way solenoid valve 86 is open in the energized position so the pressurized fluid in the second inlet passageway 150 flows into the second outlet passageway 152 and to the second outlet port 128.

Figure 11A:
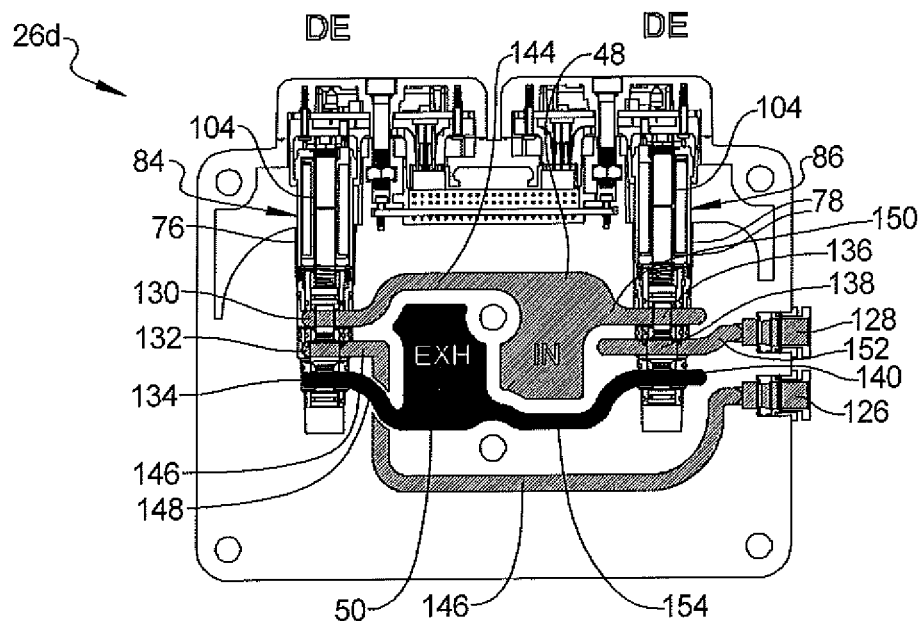
FIG. 11A is a front elevation view of an exemplary modular manifold segment of the exemplary pneumatic control valve manifold assembly illustrated in FIG. 1 where the exemplary modular manifold segment includes first and second three-way solenoid valves in a normally-open configuration with both the first and second solenoid valves shown in the de-energized position.
Figure 11B:
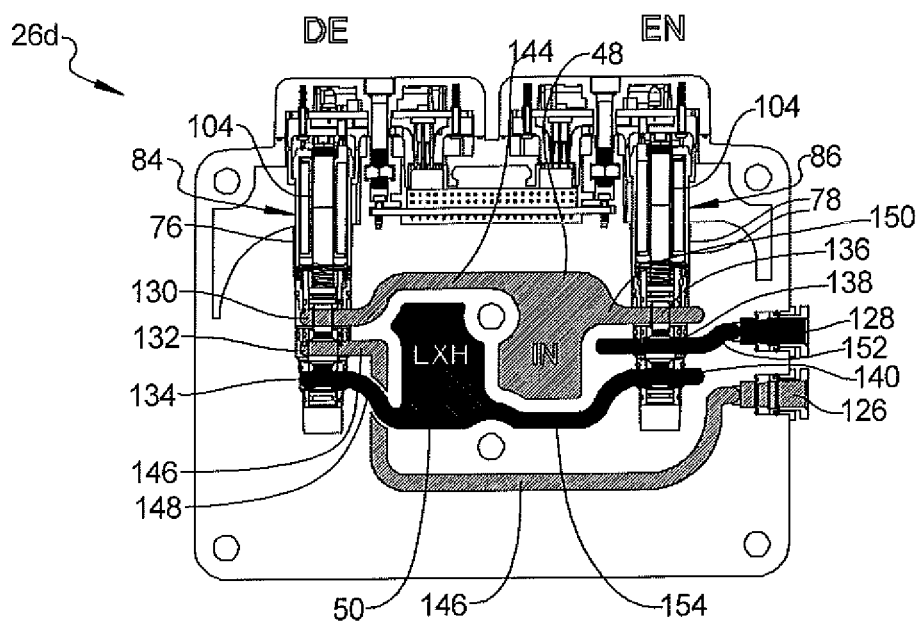
FIG. 11B is a front elevation view of the exemplary modular manifold segment illustrated in FIG. 11A where the first solenoid valve is shown in the de-energized position and the second solenoid valve is shown in the energized position.
Figure 11C:
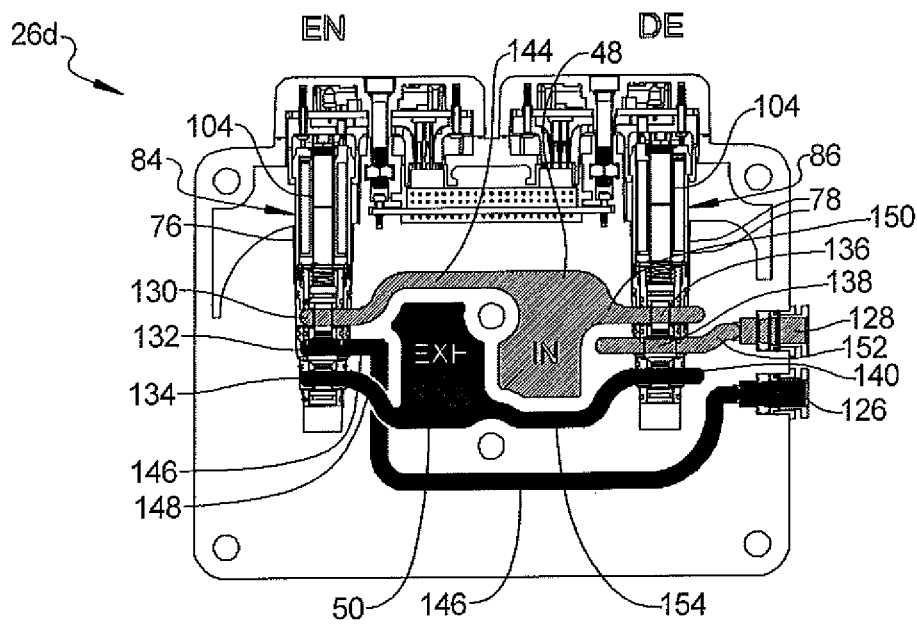
FIG. 11C is a front elevation view of the exemplary modular manifold segment illustrated in FIG. 11A where the first solenoid valve is shown in the energized position and the second solenoid valve is shown in the de-energized position.

The same exemplary modular manifold segment 26d illustrated in FIGS. 8A-D is shown in FIGS. 11A-C; however, the first and second three-way solenoid valves 84, 86 are controlled differently to mimic the operation of a single four-way, three-position pressure center valve. As in FIGS. 8A-D, it should be appreciated that the first and second three-way solenoid valves 84, 86 act as normally-open valves in the configuration shown in FIGS. 11A-C.

In FIG. 11A, the first and second three-way solenoid valves 84, 86 are in the de-energized position. Pressurized fluid from the inlet cavity 48 flows into the first and second inlet passageways 144, 150. The first and second three-way solenoid valves 84, 86 are open in the de-energized position so the pressurized fluid in the first and second inlet passageways 144, 150 flows into the first and second outlet passageways 146, 152 and to the first and second outlet ports 126, 128. In FIG. 11B, the first three-way solenoid valve 84 is in the de-energized position and the second three-way solenoid valve 86 is in the energized position. Pressurized fluid from the inlet cavity 48 flows into the first and second inlet passageways 144, 150. The first three-way solenoid valve 84 is open in the de-energized position so the pressurized fluid in the first inlet passageway 144 flows into the first outlet passageway 146 and to the first outlet port 126. The second three-way solenoid valve 86 is closed in the energized position so the second outlet port 128 is vented to the exhaust cavity 50 via the second outlet passageway 152 and the second exhaust passageway 154. In FIG. 11C, the first three-way solenoid valve 84 is in the energized position and the second three-way solenoid valve 86 is in the de-energized position. Pressurized fluid from the inlet cavity 48 flows into the first and second inlet passageways 144, 150. The first three-way solenoid valve 84 is closed in the energized position so the first outlet port 126 is vented to the exhaust cavity 50 via the first outlet passageway 146 and the first exhaust passageway 148. The second three-way solenoid valve 86 is open in the de-energized position so the pressurized fluid in the second inlet passageway 150 flows into the second outlet passageway 152 and to the second outlet port 128.

Figure 12A:
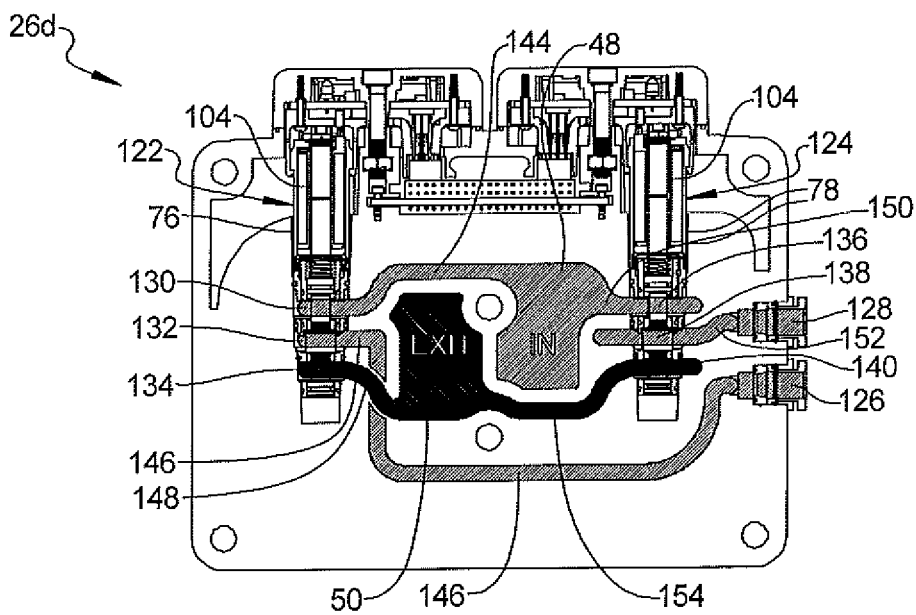
FIG. 12A is a front elevation view of an exemplary modular manifold segment of the exemplary pneumatic control valve manifold assembly illustrated in FIG. 1 where the exemplary modular manifold segment includes first and second latching three-way solenoid valves in a normally-open configuration with both the first and second solenoid valves shown in the de-energized, unlatched position.
Figure 12B:
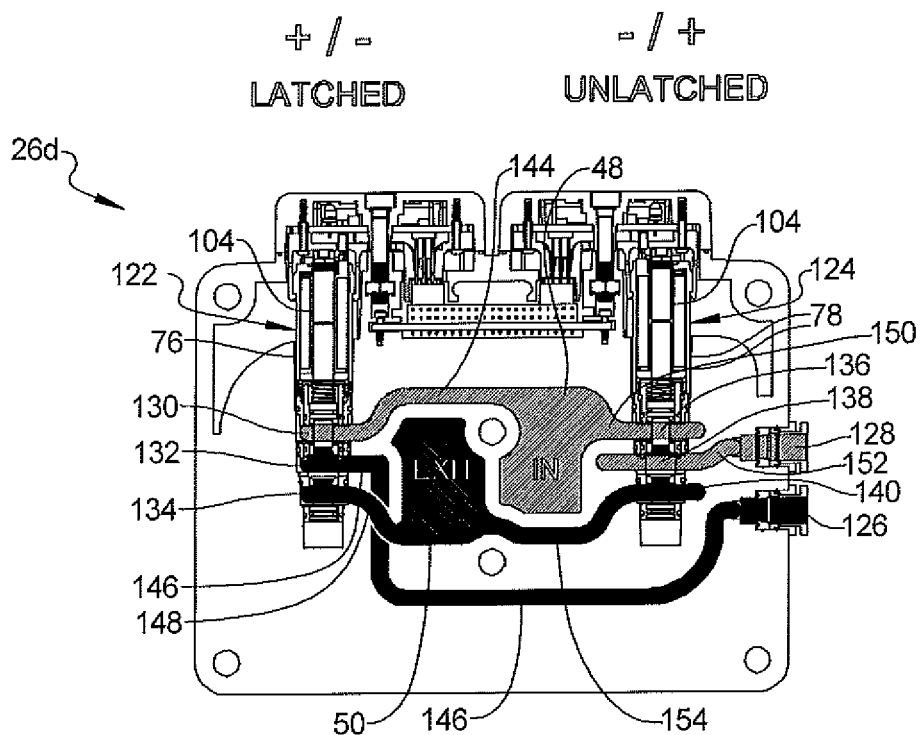
FIG. 12B is a front elevation view of the exemplary modular manifold segment illustrated in FIG. 12A where the first solenoid valve is shown in the energized, latched position and the second solenoid valve is shown in the energized, unlatched position.
Figure 12C:
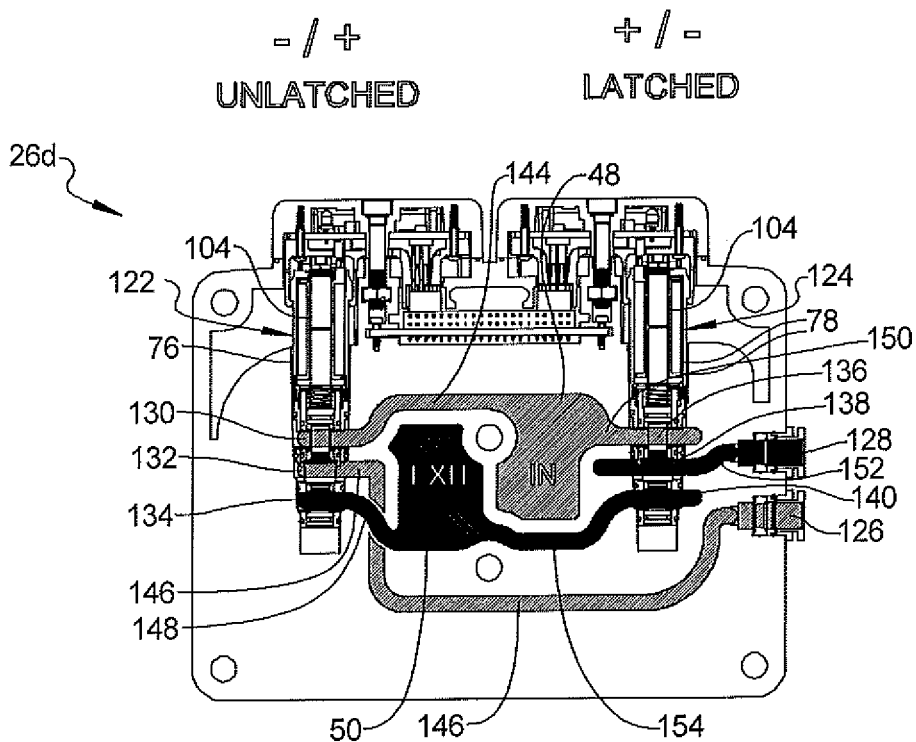
FIG. 12C is a front elevation view of the exemplary modular manifold segment illustrated in FIG. 12A where the first solenoid valve is shown in the energized, unlatched position and the second solenoid valve is shown in the energized, latched position.

The same exemplary modular manifold segment 26d illustrated in FIGS. 8A-D is shown in FIGS. 12A-C; however, first and second latching three-way solenoid valves 122, 124 are installed in the modular manifold segment 26d and are controlled to mimic the operation of a single four-way, three-position pressure center valve. As in FIGS. 8A-D, it should be appreciated that the first and second three-way solenoid valves 84, 86 act as normally-open valves in the configuration shown in FIGS. 12A-C.

In FIG. 12A, the first and second latching three-way solenoid valves 122, 124 are in an unlatched position, where the valve member 114 of the first and second latching three-way solenoid valves 122, 124 is positioned away from the solenoid 104. Pressurized fluid from the inlet cavity 48 flows into the first and second inlet passageways 144, 150. The first and second latching three-way solenoid valves 122, 124 are open in the unlatched position so the pressurized fluid in the first and second inlet passageways 144, 150 flows into the first and second outlet passageways 146, 152 and to the first and second outlet ports 126, 128. In FIG. 12B, the first latching three-way solenoid valve 122 is in a latched position, where the valve member 114 of the first latching three-way solenoid valve 122 is positioned closer to the solenoid 104. The second latching three-way solenoid valve 124 is in the unlatched position. Pressurized fluid from the inlet cavity 48 flows into the first and second inlet passageways 144, 150. The first latching three-way solenoid valve 122 is closed because it is in the latched position so the first outlet port 126 is vented to the exhaust cavity 50 via the first outlet passageway 146 and the first exhaust passageway 148. The second latching three-way solenoid valve 124 is open because it is in the unlatched position so the pressurized fluid in the second inlet passageway 150 flows into the second outlet passageway 152 and to the second outlet port 128. In FIG. 12C, the first latching three-way solenoid valve 122 is in the unlatched position. The second latching solenoid valve 124 is in a latched position, where the valve member 114 of the second latching three-way solenoid valve 124 is positioned closer to the solenoid 104. Pressurized fluid from the inlet cavity 48 flows into the first and second inlet passageways 144, 150. The first latching three-way solenoid valve 122 is open because it is in the unlatched position so the pressurized fluid in the first inlet passageway 144 flows into the first outlet passageway 146 and to the first outlet port 126. The second latching three-way solenoid valve 124 is closed because it is in the latched position so the second outlet port 128 is vented to the exhaust cavity 50 via the second outlet passageway 152 and the second exhaust passageway 154.

Figure 13A:
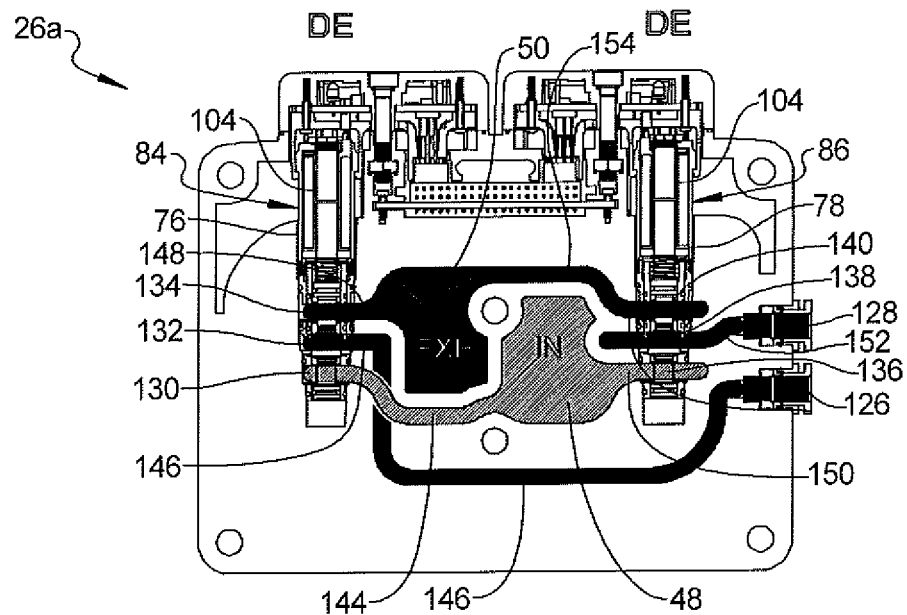
FIG. 13A is a front elevation view of an exemplary modular manifold segment of the exemplary pneumatic control valve manifold assembly illustrated in FIG. 1 where the exemplary modular manifold segment includes first and second three-way solenoid valves in a normally-closed configuration with both the first and second solenoid valves shown in the de-energized position.
Figure 13B:
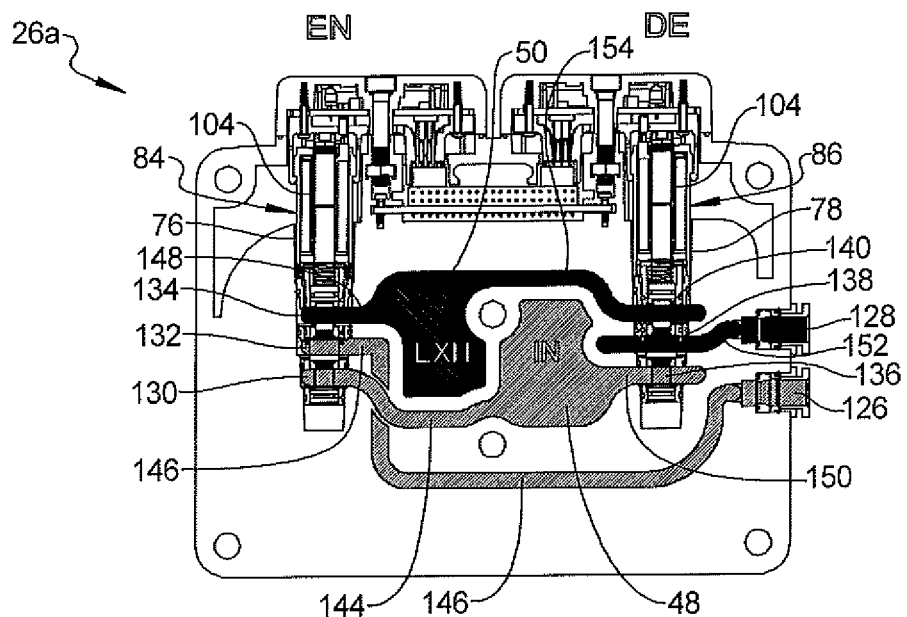
FIG. 13B is a front elevation view of the exemplary modular manifold segment illustrated in FIG. 13A where the first solenoid valve is shown in the energized position and the second solenoid valve is shown in the de-energized position.
Figure 13C:
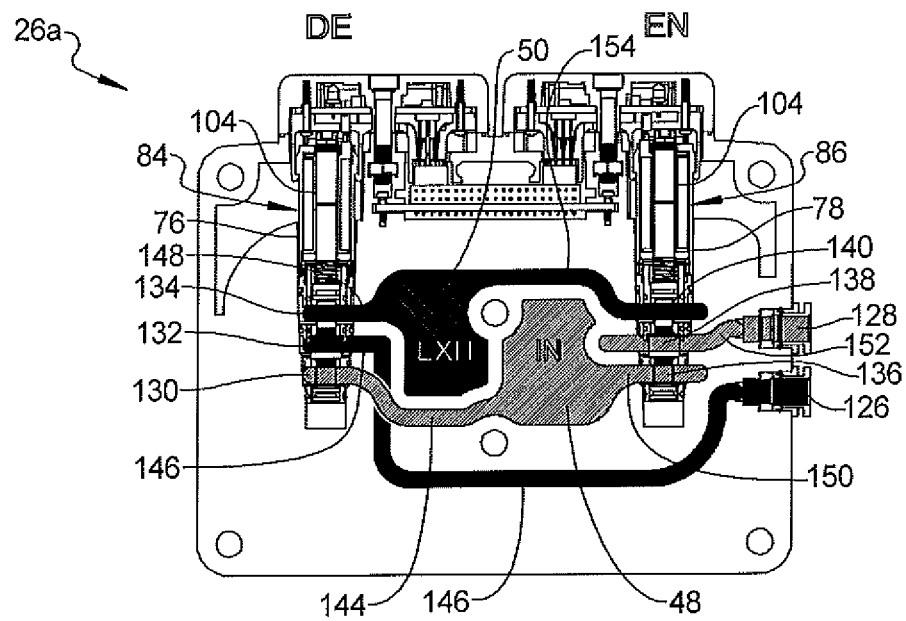
FIG. 13C is a front elevation view of the exemplary modular manifold segment illustrated in FIG. 13A where the first solenoid valve is shown in the de-energized position and the second solenoid valve is shown in the energized position.

The same exemplary modular manifold segment 26*a* illustrated in FIGS. 7A-D is shown in FIGS. 13A-C; however, the first and second three-way solenoid valves 84, 86 are controlled differently to mimic the operation of a single four-way, three-position open center valve. As in FIGS. 7A-D, it should be appreciated that the first and second three-way solenoid valves 84, 86 act as normally-closed valves in the configuration shown in FIGS. 13A-C.

In FIG. 13A, the first and second three-way solenoid valves 84, 86 are in the de-energized position. Pressurized fluid from the inlet cavity 48 flows into the first and second inlet passageways 144, 150. The first and second three-way solenoid valves 84, 86 are closed in the de-energized position so the first and second outlet ports 126, 128 are vented to the exhaust cavity 50 via the first and second outlet passageways 146, 152 and the first and second exhaust passageways 148, 154. In FIG. 13B, the first three-way solenoid valve 84 is in the energized position and the second three-way solenoid valve 86 is in the de-energized position. Pressurized fluid from the inlet cavity 48 flows into the first and second inlet passageways 144, 150. The first three-way solenoid valve 84 is open in the energized position so the pressurized fluid in the first inlet passageway 144 flows into the first outlet passageway 146 and to the first outlet port 126. The second three-way solenoid valve 86 is closed in the de-energized position so the second outlet port 128 is vented to the exhaust cavity 50 via the second outlet passageway 152 and the second exhaust passageway 154. In FIG. 13C, the first three-way solenoid valve 84 is in the de-energized position and the second three-way solenoid valve 86 is in the energized position. Pressurized fluid from the inlet cavity 48 flows into the first and second inlet passageways 144, 150. The first three-way solenoid valve 84 is closed in the de-energized position so the first outlet port 126 is vented to the exhaust cavity 50 via the first outlet passageway 146 and the first exhaust passageway 148. The second three-way solenoid valve 86 is open in the energized position so the pressurized fluid in the second inlet passageway 150 flows into the second outlet passageway 152 and to the second outlet port 128.

Figure 14A:
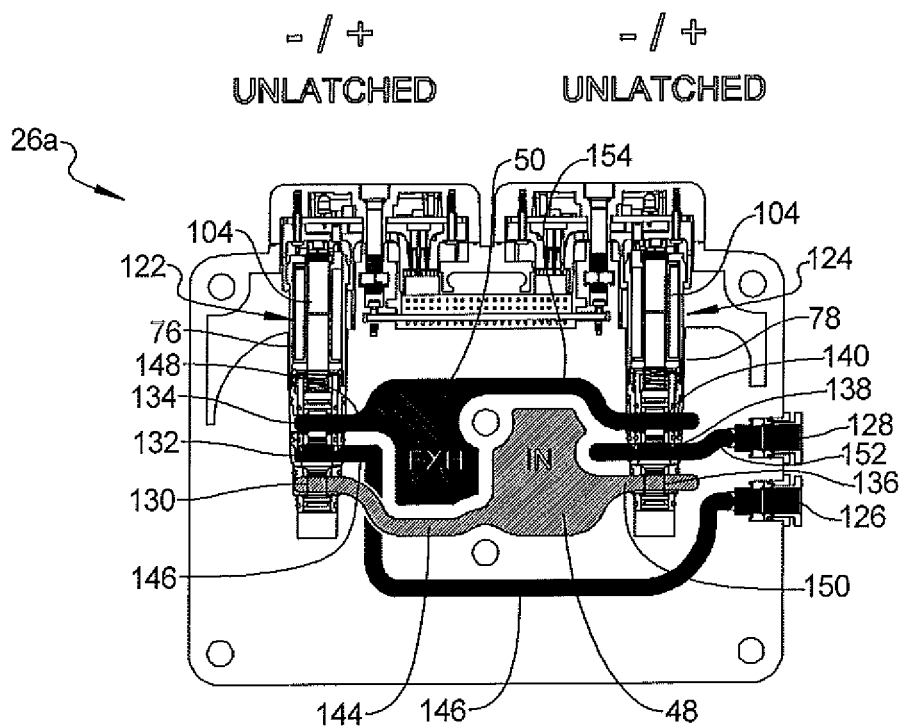
FIG. 14A is a front elevation view of an exemplary modular manifold segment of the exemplary pneumatic control valve manifold assembly illustrated in FIG. 1 where the exemplary modular manifold segment includes first and second latching three-way solenoid valves in a normally-closed configuration with both the first and second solenoid valves shown in the de-energized, unlatched position.
Figure 14B:
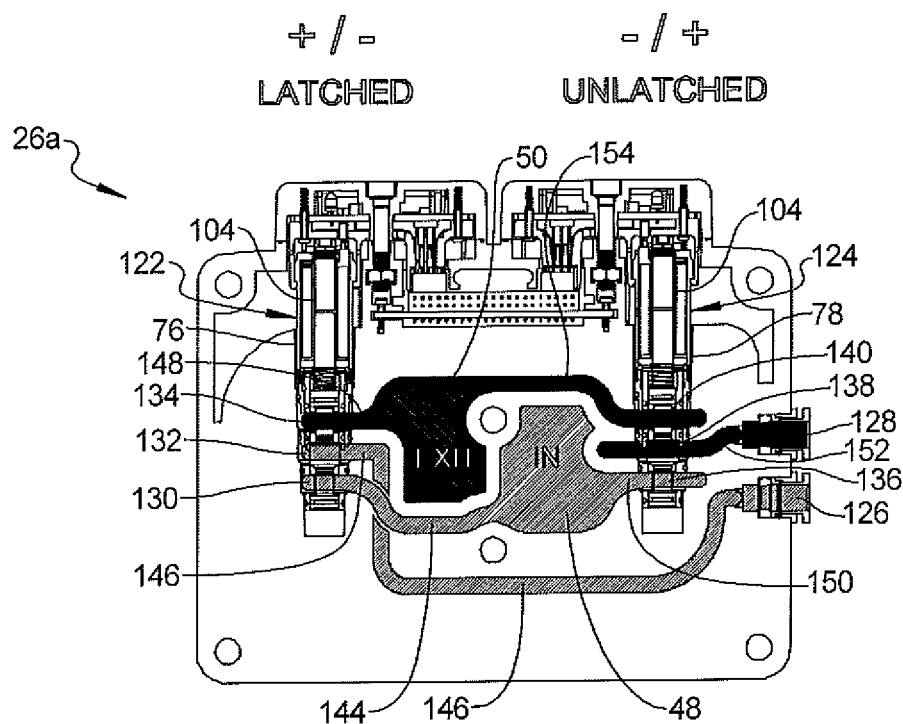
FIG. 14B is a front elevation view of the exemplary modular manifold segment illustrated in FIG. 14A where the first solenoid valve is shown in the energized, latched position and the second solenoid valve is shown in the energized, unlatched position.
Figure 14C:
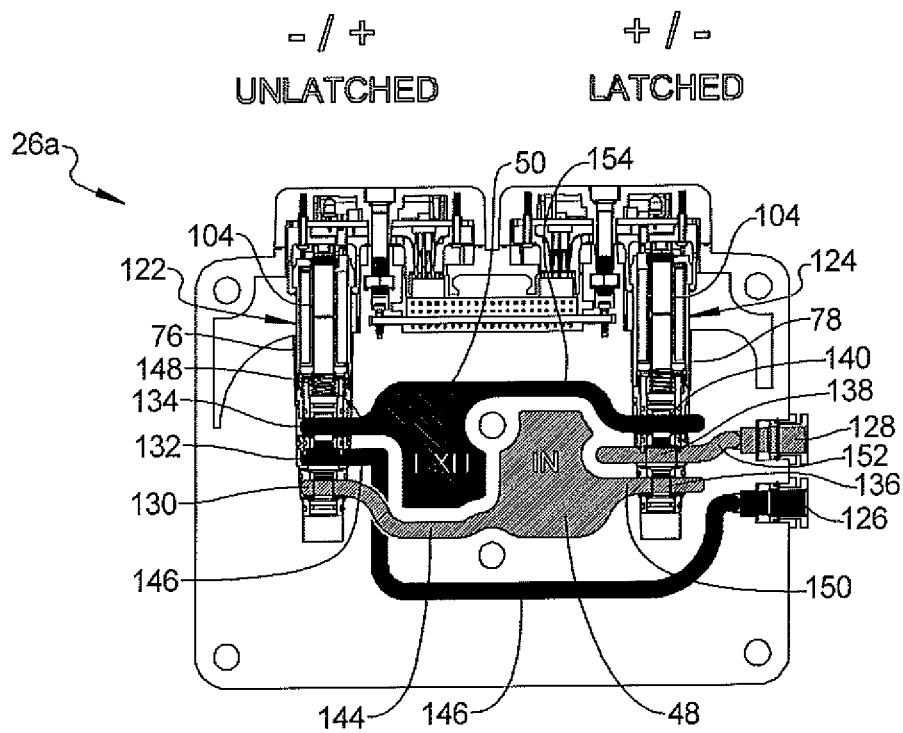
FIG. 14C is a front elevation view of the exemplary modular manifold segment illustrated in FIG. 14A where the first solenoid valve is shown in the energized, unlatched position and the second solenoid valve is shown in the energized, latched position.

The same exemplary modular manifold segment 26*a* illustrated in FIGS. 7A-D is shown in FIGS. 14A-C; however, first and second latching three-way solenoid valves 122, 124 are is installed in the modular manifold segment 26*a* and are controlled to mimic the operation of a single four-way, three-position open center valve. As in FIGS. 7A-D, it should be appreciated that the first and second latching three-way solenoid valves 122, 124 act as normally-closed valves in the configuration shown in FIGS. 14A-C.

In FIG. 14A, the first and second latching three-way solenoid valves 122, 124 are in an unlatched position, where the valve member 114 of the first and second latching three-way solenoid valves 122, 124 is positioned away from the solenoid 104. Pressurized fluid from the inlet cavity 48 flows into the first and second inlet passageways 144, 150. The first and second latching three-way solenoid valves 122, 124 are closed in the unlatched position so the first and second outlet ports 126, 128 are vented to the exhaust cavity 50 via the first and second outlet passageways 146, 152 and the first and second exhaust passageways 148, 154, In FIG. 14B, the first latching three-way solenoid valve 122 is in a latched position, where the valve member 114 of the first latching three-way solenoid valve 122, is positioned closer to the solenoid 104. The second latching three-way solenoid valve 124 is in the unlatched position. Pressurized fluid from the inlet cavity 48 flows into the first and second inlet passageways 144, 150. The first latching three-way solenoid valve 122 is open because it is in the latched position so the pressurized fluid in the first inlet passageway 144 flows into the first outlet passageway 146 and to the first outlet port 126. The second latching three-way solenoid valve 124 is closed because it is in the unlatched position so the second outlet port 128 is vented to the exhaust cavity 50 via the second outlet passageway 152 and the second exhaust passageway 154. In FIG. 14C, the first latching three-way solenoid valve 122 is in the unlatched position. The second latching three-way solenoid valve 124 is in a latched position, where the valve member 114 of the second latching three-way solenoid valve 124 is positioned closer to the solenoid 104. Pressurized fluid from the inlet cavity 48 flows into the first and second inlet passageways 144, 150. The first latching three-way solenoid valve 122 is closed because it is in the unlatched position so the first outlet port 126 is vented to the exhaust cavity 50 via the first outlet passageway 146 and the first exhaust passageway 148. The second latching three-way solenoid valve 124 is open because it is in the latched position so the pressurized fluid in the second inlet passageway 150 flows into the second outlet passageway 152 and to the second outlet port 128.

Figure 15A:
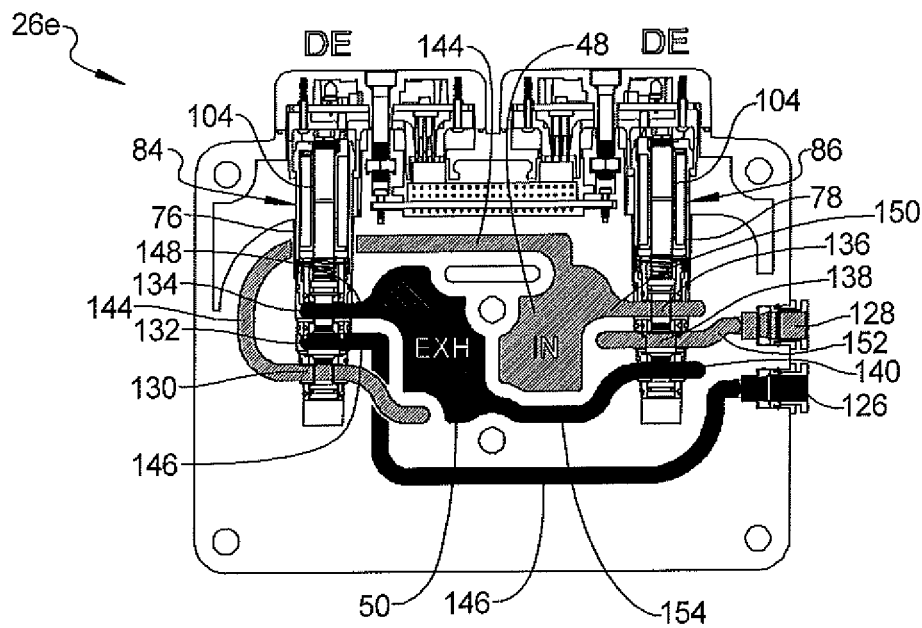
FIG. 15A is a front elevation view of an exemplary modular manifold segment of the exemplary pneumatic control valve manifold assembly illustrated in FIG. 1 where the exemplary modular manifold segment includes a first three-way solenoid valve in a normally-closed configuration and a second three-way solenoid valve in a normally-open configuration with both the first and second solenoid valves shown in the de-energized position.
Figure 15B:
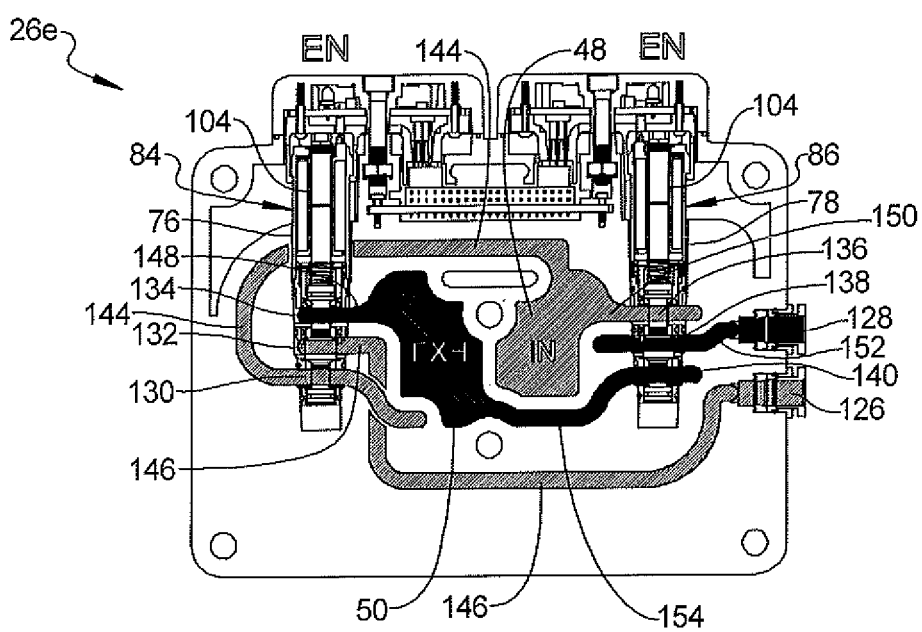
FIG. 15B is a front elevation view of the exemplary modular manifold segment illustrated in FIG. 15A where both the first and second solenoid valves are shown in the energized position.

The same exemplary modular manifold segment 26*a* illustrated in FIGS. 9A-D is shown in FIGS. 15A-B; however, the first and second three-way solenoid valves 84, 86 are controlled differently to mimic the operation of a single four-way, two-position valve. As in FIGS. 9A-D, it should be appreciated that the first three-way solenoid valve 84 acts as a normally-closed valve and the second three-way solenoid valve 86 acts as a normally-open valve in the configuration shown in FIGS. 15A-B.

In FIG. 15A, the first and second three-way solenoid valves 84, 86 are in the de-energized position. Pressurized fluid from the inlet cavity 48 flows into the first and second inlet passageways 144, 150. The first three-way solenoid valve 84 is closed in the de-energized position so the first outlet port 126 is vented to the exhaust cavity 50 via the first outlet passageway 146 and the first exhaust passageway 148. The second three-way solenoid valve 86 is open in the de-energized position so the pressurized fluid in the second inlet passageway 150 flows into the second outlet passageway 152 and to the second outlet port 128. In FIG. 15B, the first three-way solenoid valve 84 is in the energized position and the second three-way solenoid valve 86 is in the energized position. Pressurized fluid from the inlet cavity 48 flows into the first and second inlet passageways 144, 150. The first three-way solenoid valve 84 is open in the energized position so the pressurized fluid in the first inlet passageway 144 flows into the first outlet passageway 146 and to the first outlet port 126. The second three-way solenoid valve 86 is closed in the energized position so the second outlet port 128 is vented to the exhaust cavity 50 via the second outlet passageway 152 and the second exhaust passageway 154. It should be appreciated that a similar arrangement is possible based upon the configuration of the modular manifold segment 26f illustrated in FIGS. 10A-D where the first three-way solenoid valve 84 operates as a normally-open valve in the de-energized position and the second three-way solenoid valve 86 operates as a normally-closed valve.

With reference to FIGS. 16A-D, an exemplary modular manifold segment 26b is illustrated that includes first and second four-way solenoid valves 118, 120 and first, second, third and fourth outlet ports 126, 128, 156, 158. Each of the first and second four-way solenoid valves 118, 120 has a solenoid 104. Inlet and exhaust cavities 48, 50 pass between first and second valve receiving bores 76, 78 with the inlet cavity 48 positioned closer to the second valve receiving bore 78 and the exhaust cavity 50 positioned closer to the first valve receiving bore 76. The first valve receiving bore 76 has a first exhaust opening 134, a first outlet opening 132, a first inlet opening 130, a second outlet opening 138, and a second exhaust opening 140, which are listed in order moving progressively closer to the solenoid 104 of the first four-way solenoid valve 118. The second valve receiving bore 78 has a third exhaust opening 160, a third outlet opening 162, a second inlet opening 136, a fourth outlet opening 164, and a fourth exhaust opening 166, which are listed in order moving progressively closer to the solenoid 104 of the second four-way solenoid valve 120. The plurality of fluid passageways 34 include a first exhaust passageway 148 that extends between the first exhaust opening 134 and the exhaust cavity 50, a first outlet passageway 146 that extends between the first outlet opening 132 and the first outlet port 126, a first inlet passageway 144 that extends between the first inlet opening 130 and the inlet cavity 48, a second outlet passageway 152 opening that extends between the second outlet opening 138 and the second outlet port 128, and a second exhaust passageway 154 that extends between the second exhaust opening 140 and the exhaust cavity 50. The plurality of fluid passageways 34 further include a third exhaust passageway 168 that extends between the third exhaust opening 160 and the exhaust cavity 50, a third outlet passageway 170 that extends between the third outlet opening 162 and the third outlet port 156, a second inlet passageway 150 that extends between the second inlet opening 136 and the inlet cavity 48, a fourth outlet passageway 172 that extends between the fourth outlet opening 164 and the fourth outlet port 158, and a fourth exhaust passageway 174 that extends between the fourth exhaust opening 166 and the exhaust cavity 50.

Figure 16A:
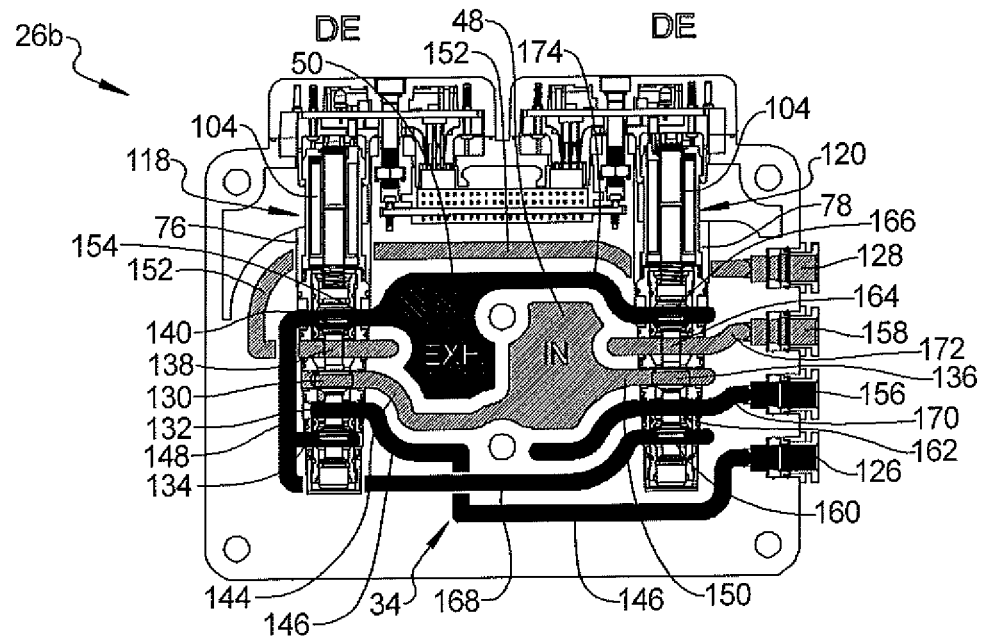
FIG. 16A is a front elevation view of an exemplary modular manifold segment of the exemplary pneumatic control valve manifold assembly illustrated in FIG. 1 where the exemplary modular manifold segment includes first and second four-way solenoid valves shown in the de-energized position.
Figure 16B:
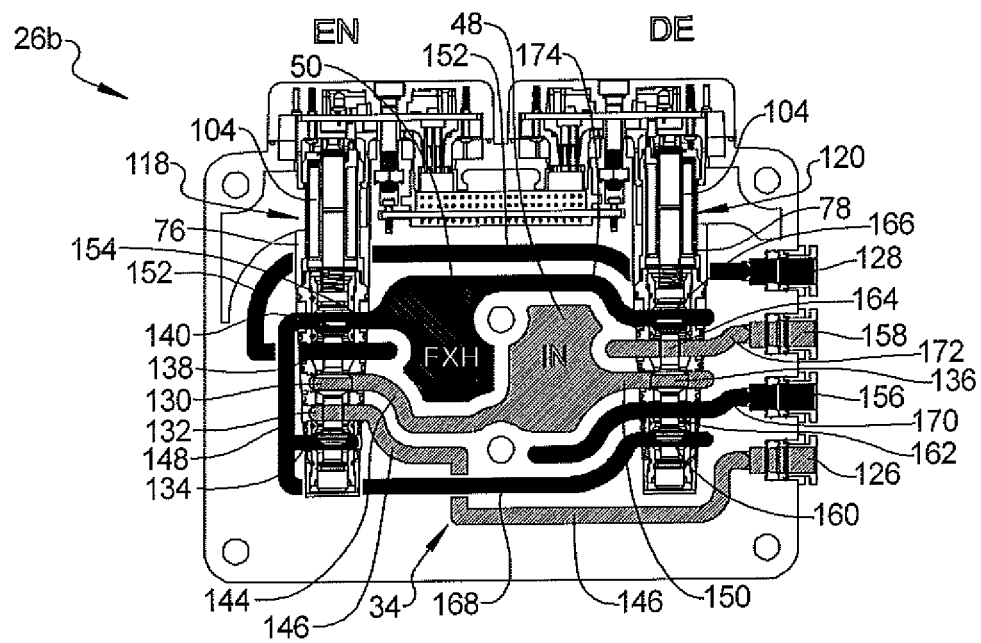
FIG. 16B is a front elevation view of the exemplary modular manifold segment illustrated in FIG. 16A where the first solenoid valve is shown in the energized position and the second solenoid valve is shown in the de-energized position.
Figure 16C:
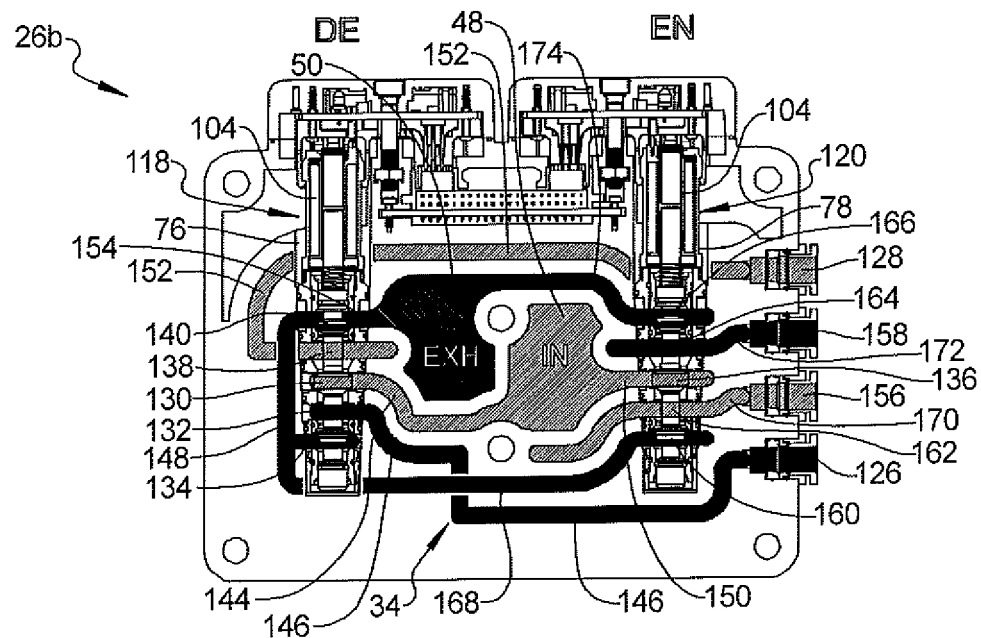
FIG. 16C is a front elevation view of the exemplary modular manifold segment illustrated in FIG. 16A where the first solenoid valve is shown in the de-energized position and the second solenoid valve is shown in the energized position.
Figure 16D:
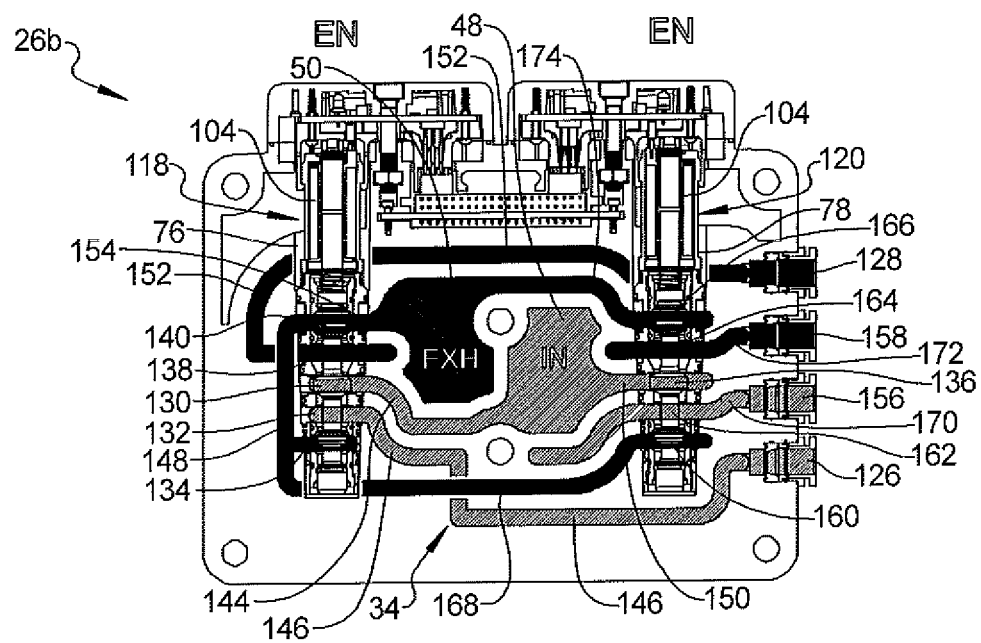
FIG. 16D is a front elevation view of the exemplary modular manifold segment illustrated in FIG. 16A where both the first and second solenoid valves are shown in the energized position.

In FIG. 16A, the first and second four-way solenoid valves 118, 120 are in the de-energized position. Pressurized fluid from the inlet cavity 48 flows into the first and second inlet passageways 144, 150. The first and third outlet ports 126, 156 and the fourth exhaust opening 166 are vented to the exhaust cavity 50 via the first and third outlet passageways 146, 170 and the first, second, third, and fourth exhaust passageways 148, 154, 168, 174. Pressurized fluid from the first and second inlet passageways 144, 150 flows into the second and fourth outlet passageways 152, 172 and to the second and fourth outlet ports 128, 158 because the first and second four-way valves 118, 120 are in the de-energized position. In FIG. 16B, the first four-way solenoid valve 118 is in the energized position and the second four-way solenoid valve 120 is in the de-energized position. Pressurized fluid from the inlet cavity 48 flows into the first and second inlet passageways 144, 150. The second and third outlet ports 128, 156 and the fourth exhaust opening 166 are vented to the exhaust cavity 50 via the second and third outlet passageways 152, 170 and the first, second, third, and fourth exhaust passageways 148, 154, 168, 174. Pressurized fluid from the first inlet passageway 144 flows into the first outlet passageway 146 and to the first outlet port 126 because the first four-way valve is in the energized position. Pressurized fluid from the second inlet passageway 150 flows into the fourth outlet passageway 172 and to the fourth outlet port 158 because the second four-way valve is in the de-energized position. In FIG. 16C, the first four-way solenoid valve 118 is in the de-energized position and the second four-way solenoid valve 120 is in the energized position. Pressurized fluid from the inlet cavity 48 flows into the first and second inlet passageways 144, 150. The first and fourth outlet ports 126, 158 and the third exhaust opening 160 are vented to the exhaust cavity 50 via the first and fourth outlet passageways 146, 172 and the first, second, third, and fourth exhaust passageways 148, 154, 168, 174. Pressurized fluid from the first inlet passageway 144 flows into the second outlet passageway 152 and to the second outlet port 128 because the first four-way valve is in the de-energized position. Pressurized fluid from the second inlet passageway 150 flows into the third outlet passageway 170 and to the third outlet port 156 because the second four-way valve is in the energized position. In FIG. 16D, the first and second four-way solenoid valves 118, 120 are in the energized position. Pressurized fluid from the inlet cavity 48 flows into the first and second inlet passageways 144, 150. The second and fourth outlet ports 128, 158 and the first and third exhaust openings 134, 160 are vented to the exhaust cavity 50 via the second and fourth outlet passageways 152, 172 and the first, second, third, and fourth exhaust passageways 148, 154, 168, 174. Pressurized fluid from the first and second inlet passageways 144, 150 flows into the first and third outlet passageways 146, 170 and to the first and third outlet ports 126, 156 because the first and second four-way valves 118, 120 are in the energized position.

Although the first manifold end segment 22, the second manifold end segment 24, and the plurality of modular manifold segments 26a, 26b, 26c, 26d, 26e, 26f may be made from a wide variety of different materials using a wide variety of different manufacturing processes, in accordance with one preferred embodiment, the first manifold end segment 22, the second manifold end segment 24, and the plurality of modular manifold segments 26a, 26b, 26c, 26d, 26e, 26f are made of a glass-reinforced engineering plastics using an injection molding process.

Many modifications and variations of the disclosed pneumatic control valve manifold assembly 20 are possible in light of the above teachings and may be practiced otherwise than as specifically described while within the scope of the appended claims. These antecedent recitations should be interpreted to cover any combination in which the inventive novelty exercises its utility. Although the subject disclosure describes and illustrates three-way and four-way solenoid valves, it should be appreciated that the scope of the subject disclosure and the appended claims is not necessarily limited to these examples. By way of example and without limitation, two-way and five-way solenoid valves may be employed. In addition, valves may be used in the disclosed pneumatic control valve manifold assembly that are not operated by a solenoid.

What is claimed is:

1. A pneumatic control valve manifold assembly comprising:

a modular manifold segment including a modular manifold segment outer perimeter, a modular manifold segment mating face, and a modular manifold segment back-side face;

a first valve receiving bore and a second valve receiving bore each extending inwardly into the modular manifold segment from said modular manifold segment outer perimeter;

an inlet cavity and an exhaust cavity each extending through said modular manifold segment and passing between said first and second valve receiving bores such that said inlet and exhaust cavities are open at said modular manifold segment mating face and said modular manifold segment back-side face;

a plurality of fluid passageways open to said modular manifold segment mating face that are arranged in fluid communication with said first and second valve receiving bores;

said plurality of fluid passageways following one of a plurality of configurations that provide different combinations of valve operations;

said modular manifold segment mating face including an abutment surface surrounding said plurality of fluid passageways, said abutment surface having a plurality of shapes depending upon said configuration of said plurality of fluid passageways; and said modular manifold segment back-side face including a plurality of sealing ribs arranged in a pattern that universally mates with each of said plurality of shapes of said abutment surface such that modular manifold segments with fluid passageways of different configurations can be stacked next to each other in a fluid-tight arrangement.

2. The pneumatic control valve manifold assembly of claim 1, further comprising:

a first outlet port and a second outlet port each disposed along said modular manifold segment outer perimeter for fluid communication with fluid driven equipment;

said first valve receiving bore arranged in fluid communication with said plurality of fluid passageways at a first inlet opening, a first outlet opening, and a first exhaust opening;

said second valve receiving bore arranged in fluid communication with said plurality of fluid passageways at a second inlet opening, a second outlet opening, and a second exhaust opening; and said plurality of fluid passageways including a first inlet passageway extending between said first inlet opening and said inlet cavity, a first outlet passageway extending between said first outlet opening and said first outlet port, a first exhaust passageway extending between said first exhaust opening and said exhaust cavity, a second inlet passageway extending between said second inlet opening and said inlet cavity, a second outlet passageway extending between said second outlet opening and said second outlet port, and a second exhaust passageway extending between said second exhaust opening and said exhaust cavity.

3. The pneumatic control valve manifold assembly of claim 2, wherein a first three-way solenoid valve is received within said first valve receiving bore and a second three-way solenoid valve is received within said second valve receiving bore, each of said first and second three-way solenoid valves having a solenoid.

4. The pneumatic control valve manifold assembly of claim 3, wherein said first and second inlet openings in said first and second valve receiving bores are positioned adjacent to said solenoids of said first and second three-way solenoid valves and wherein said first and second outlet openings in said first and second valve receiving bores are positioned between said first and second inlet openings in said first and second valve receiving bores and said first and second exhaust openings in said first and second valve receiving bores such that said first and second three-way solenoid valves operate as normally-open three-way valves.

5. The pneumatic control valve manifold assembly of claim 3, wherein said first and second exhaust openings in said first and second valve receiving bores are positioned adjacent to said solenoids of said first and second three-way solenoid valves and wherein said first and second outlet openings in said first and second valve receiving bores are positioned between said first and second inlet openings in said first and second valve receiving bores and said first and second exhaust openings in said first and second valve receiving bores such that said first and second three-way solenoid valves operate as normally-closed three-way valves.

6. The pneumatic control valve manifold assembly of claim 3, wherein said first inlet opening in said first valve receiving bore is positioned adjacent to said solenoid of said first three-way solenoid valve, wherein said second exhaust opening in said second valve receiving bore is positioned adjacent to said solenoid of said second three-way solenoid valve, and wherein said first and second outlet openings in said first and second valve receiving bores are positioned between said first and second inlet openings in said first and second valve receiving bores and said first and second exhaust openings in said first and second valve receiving bores such that said first three-way solenoid valve operates as a normally-open three-way valve and said second three-way solenoid valve operates as a normally-closed three-way valve.

7. The pneumatic control valve manifold assembly of claim 3, wherein said first exhaust opening in said first valve receiving bore is positioned adjacent to said solenoid of said first three-way solenoid valve, wherein said second inlet opening in said second valve receiving bore is positioned adjacent to said solenoid of said second three-way solenoid valve, and wherein said first and second outlet openings in said first and second valve receiving bores are positioned between said first and second inlet openings in said first and second valve receiving bores and said first and second exhaust openings in said first and second valve receiving bores such that said first three-way solenoid valve operates as a normally-closed three-way valve and said second three-way solenoid valve operates as a normally-open three-way valve.

8. The pneumatic control valve manifold assembly of claim 1, further comprising:

a first outlet port, a second outlet port, a third outlet port, and a fourth outlet port each disposed along said modular manifold segment outer perimeter for fluid communication with fluid driven equipment;

said first valve receiving bore arranged in fluid communication with said plurality of fluid passageways at a first exhaust opening, a first outlet opening, a first inlet opening, a second outlet opening, and a second exhaust opening;

said second valve receiving bore arranged in fluid communication with said plurality of fluid passageways at a third exhaust opening, a third outlet opening, a second inlet opening, a fourth outlet opening, and a fourth exhaust opening; and said plurality of fluid passageways including a first exhaust passageway extending between said first exhaust opening and said exhaust cavity, a first outlet passageway extending between said first outlet opening and said first outlet port, a first inlet passageway extending between said first inlet opening and said inlet cavity, a second outlet passageway extending between said second outlet opening and said second outlet port, a second exhaust passageway extending between said second exhaust opening and said exhaust cavity, a third exhaust passageway extending between said third exhaust opening and said exhaust cavity, a third outlet passageway extending between said third outlet opening and said third outlet port, a second inlet passageway extending between said second inlet opening and said inlet cavity, a fourth outlet passageway extending between said fourth outlet opening and said fourth outlet port, and a fourth exhaust passageway extending between said fourth exhaust opening and said exhaust cavity.

9. The pneumatic control valve manifold assembly of claim 8, wherein a first four-way solenoid valve is received within said first valve receiving bore and a second four-way solenoid valve is received within said second valve receiving bore.

10. The pneumatic control valve manifold assembly of claim 1, wherein a first latching solenoid valve is received within said first valve receiving bore and a second latching solenoid valve is received within said second valve receiving bore.

11. The pneumatic control valve manifold assembly of claim 1, further comprising:
a plurality of channels disposed between said plurality of sealing ribs on said modular manifold back-side face, said plurality of channels being open to said modular manifold segment back-side face and aligned with portions of said plurality of passageways to increase fluid capacity of said plurality of passageways when two modular manifold segments are stacked next to each other.

12. The pneumatic control valve manifold assembly of claim 1, further comprising:
each of said modular manifold segment mating face and said modular manifold segment back-side face including tie rod receiving holes; and
tie rods disposed within and extending longitudinally from said tie rod receiving holes.

13. The pneumatic control valve manifold assembly of claim 1, wherein said abutment surface of said modular manifold segment mating face includes a groove that receives a seal.

14. The pneumatic control valve manifold assembly of claim 1, wherein a first valve axis extends co-axially within said first valve receiving bore and a second valve axis extends co-axially within said second valve receiving bore and wherein said first valve axis extends parallel to said second valve axis.

15. The pneumatic control valve manifold assembly of claim 1, further comprising:
a first manifold end segment including a first manifold end segment outer perimeter, a first manifold end face, and a first manifold end segment mating face;
a second manifold end segment including a second manifold end segment outer perimeter, a second manifold end face, and a second manifold end segment mating face;

said modular manifold segment positioned between said first manifold end segment and said second manifold end segment;
said inlet cavity extending from said first manifold end segment, through said modular manifold segment, and into said second manifold end segment for receiving inlet air; and
said exhaust cavity extending from said first manifold end segment, through said modular manifold segment, and into said second manifold end segment for receiving exhaust air.

16. The pneumatic control valve manifold assembly of claim 15, wherein said first manifold end segment includes a first inlet port and a first exhaust port each disposed on said first manifold end segment outer perimeter, said second manifold end segment includes a second inlet port and a second exhaust port each disposed on said second manifold end segment outer perimeter, said first and second inlet ports being arranged in fluid communication with said inlet cavity, and said first and second exhaust ports being arranged in fluid communication with said exhaust cavity.

17. The pneumatic control valve manifold assembly of claim 15, further comprising:
a vent cavity extending from said first manifold end segment, through said modular manifold segment, and into said second manifold end segment; and
each of said first and second valve receiving bores including a vent opening disposed in fluid communication with said vent cavity.

18. The pneumatic control valve manifold assembly of claim 15, wherein said first manifold end segment, said second manifold end segment, and said modular manifold segment are made of an engineering thermoplastic.

19. A pneumatic control valve manifold assembly comprising:
a modular manifold segment including a modular manifold segment outer perimeter, a modular manifold segment mating face, and a modular manifold segment back-side face;
a first valve receiving bore and a second valve receiving bore each extending inwardly into the modular manifold segment from said modular manifold segment outer perimeter;
an inlet cavity and an exhaust cavity each extending through said modular manifold segment and passing between said first and second valve receiving bores such that said inlet and exhaust cavities are open at said modular manifold segment mating face and said modular manifold segment back-side face;
a plurality of fluid passageways open to said modular manifold segment mating face;
a first valve received within said first valve receiving bore;
a second valve received within said second valve receiving bore;
said first and second valves being four-way solenoid operated valves;
a first outlet port, a second outlet port, a third outlet port, and a fourth outlet port each disposed along said modular manifold segment outer perimeter for fluid communication with fluid driven equipment;
said first valve receiving bore arranged in fluid communication with said plurality of fluid passageways at a first exhaust opening, a first outlet opening, a first inlet opening, a second outlet opening, and a second exhaust opening;

said second valve receiving bore arranged in fluid communication with said plurality of fluid passageways at a third exhaust opening, a third outlet opening, a second inlet opening, a fourth outlet opening, and a fourth exhaust opening; and said plurality of fluid passageways including a first exhaust passageway extending between said first exhaust opening and said exhaust cavity, a first outlet passageway extending between said first outlet opening and said first outlet port, a first inlet passageway extending between said first inlet opening and said inlet cavity, a second outlet passageway opening extending between said second outlet opening and said second outlet port, a second exhaust passageway extending between said second exhaust opening and said exhaust cavity, a third exhaust passageway extending between said third exhaust opening and said exhaust cavity, a third outlet passageway extending between said third outlet opening and said third outlet port, a second inlet passageway extending between said second inlet opening and said inlet cavity, a fourth outlet passageway extending between said fourth outlet opening and said fourth outlet port, and a fourth exhaust passageway extending between said fourth exhaust opening and said exhaust cavity.

20. The pneumatic control valve manifold assembly of claim 19, wherein said plurality of fluid passageways follow one of a plurality of configurations, wherein said modular manifold segment mating face includes an abutment surface surrounding said plurality of fluid passageways, wherein said abutment surface has a plurality of shapes depending upon said configuration of said plurality of fluid passageways, and wherein said modular manifold segment backside face includes a plurality of sealing ribs arranged in a pattern that universally mates with each of said plurality of shapes of said abutment surface such that modular manifold segments with fluid passageways of different configurations can be stacked next to each other.

* * * * *